(12) United States Patent
    Murray et al.

(10) Patent No.: US 11,511,776 B2
(45) Date of Patent: Nov. 29, 2022

(54) SYSTEM AND METHOD FOR IN-MOTION RAILCAR LOADING

(71) Applicant: BHP Canada Inc., Saskatoon (CA)

(72) Inventors: Martin Murray, Toronto (CA); Yu Hin Wu, Markham (CA); William Wang, Milton (CA); Ryan Jolivet, Mississauga (CA); Volodymyr Ponomar, Oakville (CA); Matthew MacLeod, Oakville (CA); Maurizio Darini, Toronto (CA); David Henry Rudge, Burlington (CA)

(73) Assignee: BHP BILLITON CANADA INC., Saskatoon (CA)

( * ) Notice: Subject to any disclaimer, the term of this patent is extended or adjusted under 35 U.S.C. 154(b) by 567 days.

(21) Appl. No.: 16/690,186

(22) Filed: Nov. 21, 2019

(65) Prior Publication Data
US 2020/0156670 A1    May 21, 2020

Related U.S. Application Data

(60) Provisional application No. 62/770,230, filed on Nov. 21, 2018.

(51) Int. Cl.
*B61D 39/00* (2006.01)
*B25J 9/16* (2006.01)
*B65G 67/22* (2006.01)

(52) U.S. Cl.
CPC .......... *B61D 39/006* (2013.01); *B25J 9/1664* (2013.01); *B25J 9/1669* (2013.01); *B25J 9/1679* (2013.01); *B25J 9/1682* (2013.01); *B61D 39/007* (2013.01); *B65G 67/22* (2013.01); *B65G 2814/0302* (2013.01); *B65G 2814/0349* (2013.01)

(58) Field of Classification Search
CPC ........ B61D 39/006; B61D 39/007; B25J 1/12; B25J 9/026; B25J 15/0057
See application file for complete search history.

(56) References Cited

U.S. PATENT DOCUMENTS

| | | |
|---|---|---|
| 3,831,792 A | 8/1974 | Waterman et al. |
| 4,353,312 A | 10/1982 | Brouwer |
| (Continued) | | |

FOREIGN PATENT DOCUMENTS

| | | |
|---|---|---|
| CA | 1193141 A | 9/1985 |
| CA | 2782988 A1 | 11/2012 |
| WO | WO 2016/180618 | 11/2016 |

OTHER PUBLICATIONS

RotoHatch © by EcoFab, Dec. 2018, downloaded from https://www.ecofab.com/systems, 1 pg.

*Primary Examiner* — Thomas Randazzo
(74) *Attorney, Agent, or Firm* — Frost Brown Todd LLC

(57) ABSTRACT

A system and method for loading railcars of a train wherein the railcars are provided with upper lids having latches for securing the lids in a closed position. The system comprises at least one sensing system for determining the position of the latches and the lids in order for one or more robot arms to perform operations such as unlatching, latching, lid opening and lid closing. At least one velocity sensor measures individual railcar velocity rather than overall train speed to enable engagement of the one or more robotic arms, as adjacent railcars may move at differing velocities due to slack in the connections between them.

30 Claims, 20 Drawing Sheets

(56) References Cited

U.S. PATENT DOCUMENTS

| | | | |
|---|---|---|---|
| 5,421,687 A | 6/1995 | Wayman | |
| 5,456,188 A * | 10/1995 | Lowing | B61D 39/006 |
| | | | 105/377.01 |
| 7,178,465 B1 | 2/2007 | Marchiori et al. | |
| 7,192,238 B2 | 3/2007 | Theurer | |
| 8,182,190 B2 | 5/2012 | Ash | |
| 8,250,991 B2 | 8/2012 | Brandt | |
| 9,346,473 B1 | 5/2016 | Herzog et al. | |
| 9,580,086 B2 | 2/2017 | Low et al. | |
| 2006/0198721 A1 | 9/2006 | Harrold | |
| 2009/0235841 A1* | 9/2009 | Baranowski | B61D 39/002 |
| | | | 105/377.09 |
| 2010/0326318 A1* | 12/2010 | Baranowski | B61D 39/006 |
| | | | 105/377.01 |
| 2012/0024190 A1* | 2/2012 | Baranowski | B61D 17/16 |
| | | | 105/377.11 |
| 2016/0001792 A1* | 1/2016 | Gibney | B61D 39/001 |
| | | | 105/377.06 |
| 2017/0349195 A1 | 12/2017 | Benedict | |
| 2018/0186384 A1 | 7/2018 | Fisk et al. | |
| 2019/0302764 A1* | 10/2019 | Smith | G05D 1/0276 |

* cited by examiner

SYSTEM AND METHOD FOR IN-MOTION RAILCAR LOADING

CROSS-REFERENCE TO RELATED APPLICATIONS

This application claims priority to and benefit of U.S. Ser. No. 62/770,230, filed Nov. 21, 2018, the contents of which are incorporated in their entirety for all purposes.

FIELD

The present invention relates to systems and methods for automated operations of railcars, and more specifically to automated loading of railcars while in motion.

BACKGROUND

It is known to employ trains of individual railcars for transporting granular materials, such as potash. Loading of railcars relies heavily on manual labour, especially in the case of railcars having upper lids that are latched for transport. Typical railcar loading systems currently in use at storage facilities around the world require significant manual intervention in order to operate. Recent installations and facility upgrades have attempted to introduce automation, but have only been able to automate portions of the overall process. Manual intervention is required in most cases for opening railcar latches and lids by hand, and positioning loading spouts in each lid opening. Positioning of the trains for loading is commonly done by splitting unit trains into smaller sections of 10 to 30 railcars and shuttling cars using railcar movers. Opening and closing lids on railcars requires operators to access the tops of railcars, which involves work at heights and typically isolation mechanisms to ensure the railcars cannot move and controls to either prevent railcar motion, or at least to sufficiently control railcar motion to allow access while in motion.

These manual activities constrain the average train loading rate achievable and introduce several risks involving personnel interactions with railcar and mobile equipment. In order to mitigate these risks, sites revert to stringent operating practices around manual activities, which add cost and infrastructure to enable them. Sites are also limited in throughput capacity, which often requires installing loading capability on multiple tracks in order to meet overall site throughput capacity.

Some solutions have been proposed to introduce automation, although most are directed to automated opening and closing of bottom hatches on hopper-type railcars for dumping of the product load rather than loading. For example, U.S. Pat. No. 8,250,991 to Brandt teaches a system for unloading a train of railcars while in motion, including carriage-mounted tool systems for engaging capstans and vision devices for locating the capstans. In a further example, U.S. Pat. No. 7,178,465 to Marchiori et al. teaches another bottom door opening system, in which sensors are used to locate tool carriages.

U.S. Pat. No. 3,831,792 to Waterman et al. teaches a system for automated opening and closing of top lids on railcars, wherein a custom handle engages and runs along an overhead track during the loading process, with the track curved such that the handle causes the lid to open and close as the handle moves along the course of the overhead track. This is similar to the RotoHatch™ system commercialized by the EcoFab group of companies. However, this solution requires that every railcar lid be of the custom design to engage with the opening/closing structure.

Further, the few systems teaching opening/closing systems for upper lids are not directed to lids that latch, as is required in industries such as the potash industry.

In addition, systems fail to identify the issue of slack between railcars, and that each railcar may be moving at a slightly different velocity at the point of automated loading. Railcars are in dynamic motion during the loading process, also including tilting and elevation shifts, and systems failing to take this into account may suffer from a lack of accuracy in positioning tool carriages.

SUMMARY

A system and method for loading railcars having upper lids with latches, while the railcars are in motion through a loading facility is provided. This end can be achieved by means for locating the lid and latch and other features of each, and then employing robotic arms to unlatch, open, close and re-latch, all while the railcar is moving through a loading facility and while the velocity of the railcar is being determined and that velocity is used to guide the robotic arms.

In one aspect, a railcar operation system for performing an operation on a moving railcar in a string of railcars is provided, where the moving railcar has a latch and a lid. The system can include a sensing system for detecting a position of at least one of: the latch; and the lid, on the moving railcar, at least one velocity sensor for measuring a moving speed of the moving railcar separate from other railcars in the string of railcars, a robot arm for executing the operation on the at least one of: the latch; and the lid, and at least one controller for using a measured moving speed of the moving railcar with the position of the at least one of: the latch; and the lid, to generate commands to instruct the robot arm. The robot arm, in response to the commands from the at least one controller, can execute an adjusted toolpath to follow the moving railcar and to engage with the at least one of: the latch; and the lid, for performing the operation while the railcar is moving.

In another aspect, a method for performing an operation on a moving railcar in a string of railcars is provided, where the moving railcar has a latch and a lid. The method can include detecting a position of at least one of: the latch; and, the lid, on the moving railcar, measuring a moving speed of the moving railcar separate from other railcars in the string of railcars, using the measured moving speed of the moving railcar and the position of the at least one of: the latch, and, the lid, to determine an adjusted toolpath, and having a robot arm execute the operation on the at least one of: the latch; and, the lid, while the railcar is moving by following the adjusted toolpath.

In another aspect, a railcar loading system for loading materials into a series of moving railcars passing through a series of stations is provided, where each railcar has a latch and a lid. The railcar loading system includes at least one sensing system for detecting positions of the latch and positions of the lid on a moving railcar relative to a railcar coordinate system, the railcar coordinate system fixed relative to the moving railcar, at least one velocity sensor for measuring a moving speed of the moving railcar, a first robot arm for performing an operation of unlatching the latch at an unlatching station, a second robot arm for performing an operation of opening the lid at a lid opening station, a loading device for performing an operation of loading materials into each moving railcar at a filling station, a third robot arm for performing an operation of closing the lid at a lid-closing station, a fourth robot arm for performing an operation of latching the latch at a latching station, and at least one controller for generating commands to instruct each robot arm for performing the corresponding operation. The at least one controller can use a measured moving speed of the moving railcar and the position of at least one of: the latch, and, the lid, to determine an adjusted toolpath for each robot arm and then instruct each robot arm to follow the determined adjusted toolpath to engage with one of: the latch; and the lid, while the railcar is moving through the station to perform the robot arms corresponding operation.

In one exemplary system, a train of railcars is moved through a loading facility at a slow but steady rate of speed. As each railcar enters the facility, it is scanned by a system comprising a plurality of sensors, such as cameras, which system is thus able to identify the location of the latch and send a signal to a controller to position a first robotic arm adjacent the latch and then unlatch the latch at a first robotic arm station. At a second robotic arm station, as the railcar continues moving through the facility, a second robotic arm opens the now-unlatched lid, and the railcar moves into a loading area where loading equipment fills the railcar interior with the specific product such as potash. Once filled, the still-moving railcar can enter a third station wherein a third robotic arm operates to close the lid. Finally, at a fourth station, a fourth robotic arm operates along its adjusted toolpath to engage the latch and thus secure the lid in a closed position for further transport, and the railcar exits the facility.

The robotic arms can be directed by a controller to enact an adjusted toolpath based on the specific function of the particular robotic arm and the location and speed of the railcar and the target latch or lid, as the case may be.

In some exemplary embodiments of the present invention, the instantaneous velocity of a railcar is determined by at least one velocity sensor such as a laser surface velocimeter, which velocity information is communicated to the controller to aid the robotic arm in being positioned correctly in order to execute its toolpath. The combination of the system, the at least one velocity sensor and the control system works to provide the controller with information on the latch and lid location in three-dimensional space at a series of points as the railcar moves through the facility. As stated above, while a train may move at a given speed, the individual railcars move at slightly differing speeds compared to adjacent railcars due to slack in the connection members, and the determination of individual railcar velocity thus enables more accurate robotic arm engagement. Further, individual railcars may be subject of slightly differing tilt and elevation during passage through the loading facility, and the combination of the system and at least one velocity sensor may allow more effective tracking of the individual railcars for the various stages of the loading process.

A detailed description of exemplary embodiments of the present invention is given in the following. It is to be understood, however, that the invention is not to be construed as being limited to these embodiments. The exemplary embodiments are directed to a particular application of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary aspects.

Figure 1A:
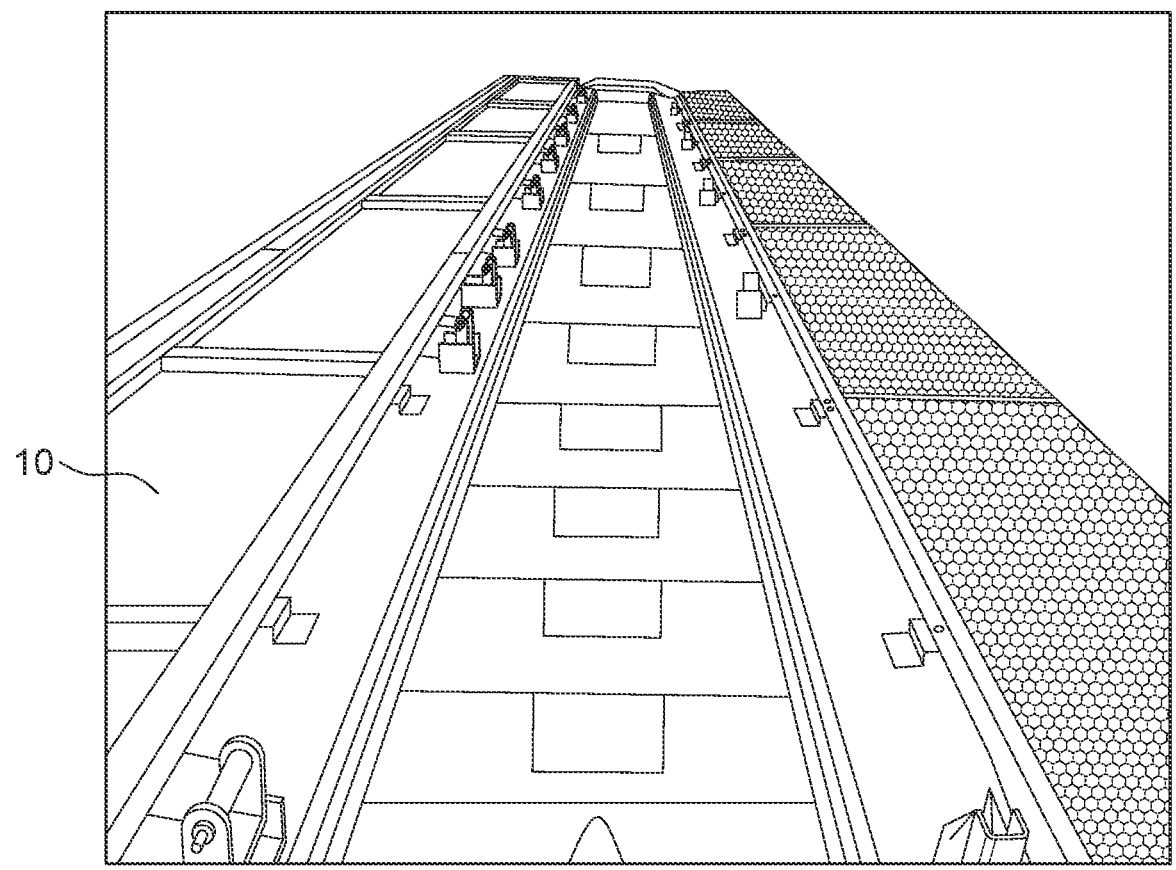
FIGS. 1a and 1b are top perspective views of conventional railcar lids in the opened and closed orientations.

Aspects of the present invention will now be described with reference to the accompanying drawings.

DETAILED DESCRIPTION

As described herein, a loading system that may incorporate railcars of varying lid and latch designs and account for differences from manufacturing tolerances, differing railcar position (tilt, elevation, orientation), and velocities between adjacent railcars, while reducing manpower requirements.

Throughout the following description specific details are set forth in order to provide a more thorough understanding to persons skilled in the art. However, well known elements may not have been shown or described in detail to avoid unnecessarily obscuring the disclosure. The following description is not intended to be exhaustive or to limit the invention to the precise form of any exemplary embodiment. Accordingly, the description and drawings are to be regarded and interpreted in an illustrative, rather than a restrictive, sense.

While the following description is directed to the loading of potash into railcars, it will be clear to those skilled in the art that the applicability of the present invention extends beyond the potash industry to other forms of product that may be transported by rail.

Before product loading may begin, the product warehouse control system refers to the marketing system to determine when a train may arrive to be loaded and may ensure sufficient product exists, and is in a pile that has been groomed prior to train arrival at site so that the train loading process can be completed without any interruptions in loading rate. The reclaimer may perform the necessary pile grooming while pre-loading the load-out surge bin.

Surge and storage capacity for railcar loading systems is provided by product storage bins. These bins accept the product from the conveyances, and discharge the required amount for loading to the weigh bins. The reclaiming rate from the storage building is typically controlled by the bin level to ensure a steady feed to the weigh bins. The method of operation is that the product storage surge bin allows product to flow to the weigh bin continuously while weighing and dispatching take place. The two-stage system allows the load to be pre-filled while the railcars are moving or the loading spout is getting into position.

The weigh bin is instrumented with load cells to determine when a predetermined weight has entered the bin. At the predetermined weight, a charging gate closes and a weigh bin waits to freely discharge into a railcar. The weigh bin normally empties multiple times into each railcar with the final fill as a top-up to meet a maximum allowable loading without going over and incurring rail penalties. The weights are recorded by the loading system so that the exact weight of product loaded is known.

In conventional loading systems, a speed and positioning of the railcars may be achieved by either railcar indexers and/or railcar movers. In the case of remote-controlled indexers, smaller strings of railcars are disconnected from the train and moved into position for loading, with the indexer holding each railcar stationary to enable loading before advancing the subsequent railcar into position. An operator can then engage in the unlatching, opening, closing and latching activities from a position on top of each railcar when it is stationary. A railcar mover, while operating in a similar fashion to an indexer, may not be controlled from a control room and thus introduces greater risk as it requires excellent communication protocols between a railcar mover operator, a train operator, and a load-out control room operator to ensure that personnel are not on a moving railcar.

An additional challenge to using the railcar mover to position a string of railcars with any degree of precision for loading is the slack in the couplings between the cars in a string. As the slack is loosened or taken up, a string of railcars can act like an accordion making precise positioning very difficult. The load-out operator must then accommodate this movement by doing the final positioning of the loading spouts manually. By contrast, an indexing system typically indexes the specific railcar that is being loaded, so the other railcars in the string do not impact positioning. Attempting to position railcars using a railcar mover decreases the overall loading efficiency. Railcar movers are also limited in the number of railcars they can position in a string due to the available traction. Depending on site grade, turn radius, and operating temperature (impacting the presence of ice or frost on the tracks, which can be mitigated by application of sand), railcar movers may be limited to 10 to 20 cars. Some sites move larger strings using site locomotives which can handle 30 cars or more, but the general inefficiencies remain.

According to an aspect herein, a remote locomotive control system is used to control the speed of the train, and the railcars may be loaded continuously without stopping. Remote locomotive control systems such as Locotrol™ (a product of GE Transportation Systems) operate trains using distributed power (with multiple locomotives distributed throughout the train—typically two at the front, two mid-train, and one at the rear) to provide more efficient load sharing and lower coupling forces, but these systems also allow locomotives to be operated remotely from a control room and can hold the train at a fixed low speed between 0.3 and 0.5 mph. Loading the train continuously unlocks significant value since a standard train may be loaded entirely within a single 12-hour shift, such that the rail service provider may leave locomotive power connected to the train. If the train can be loaded entirely within a 12-hour shift, including train drop-off at site, transfer of custody to the customer, loading, checks, and return to the rail service provider, then there is no need to disconnect power. Normally, since sites may require three to four days to load a full unit train of approximately 170 cars, the rail service provider may drop railcars off at the site and then return to assemble the railcars into a full train and pull them out days later. The rail service provider incurs greater cost due to additional transit time and handling, plus loss of efficiency since their power is doing less productive work. Also, the site requires much greater storage track space.

Figure 1B:
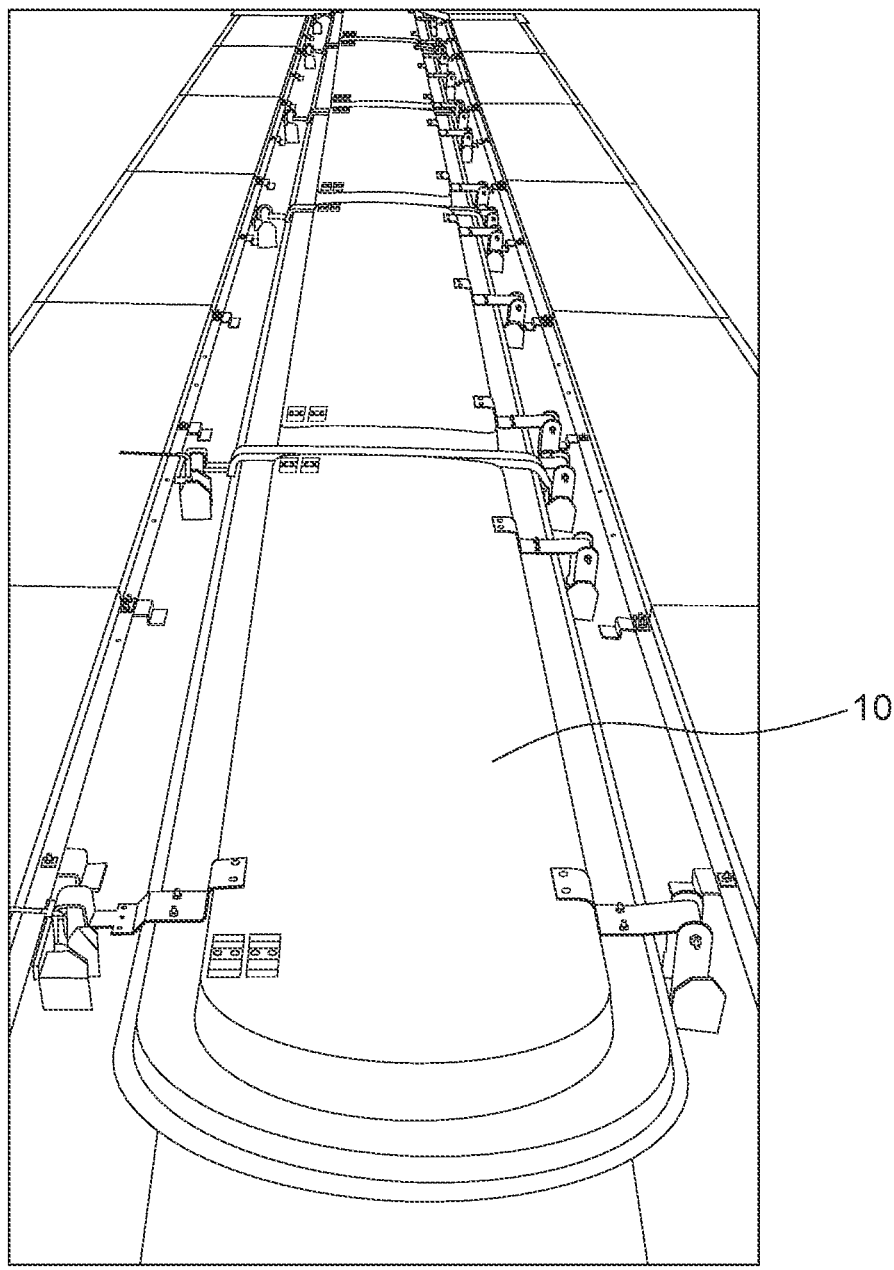
Figure 2A:
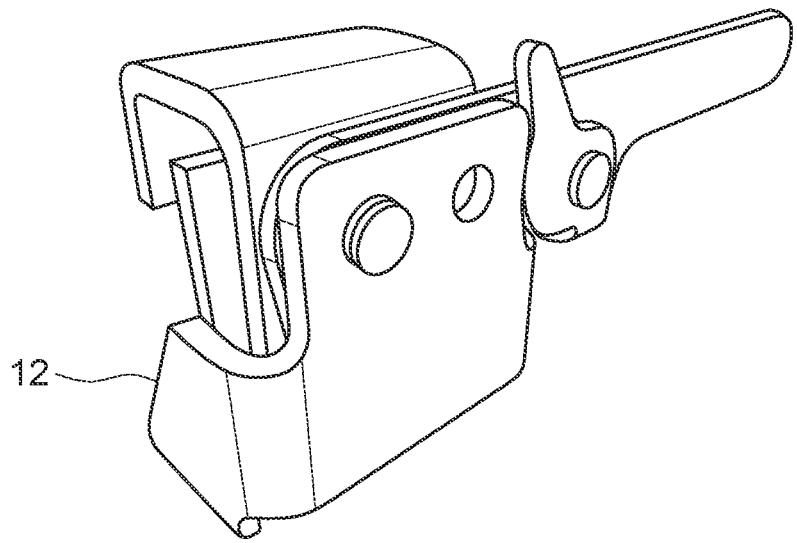
FIGS. 2a and 2b are side perspective views of conventional latches for a railcar lid.
Figure 2B:
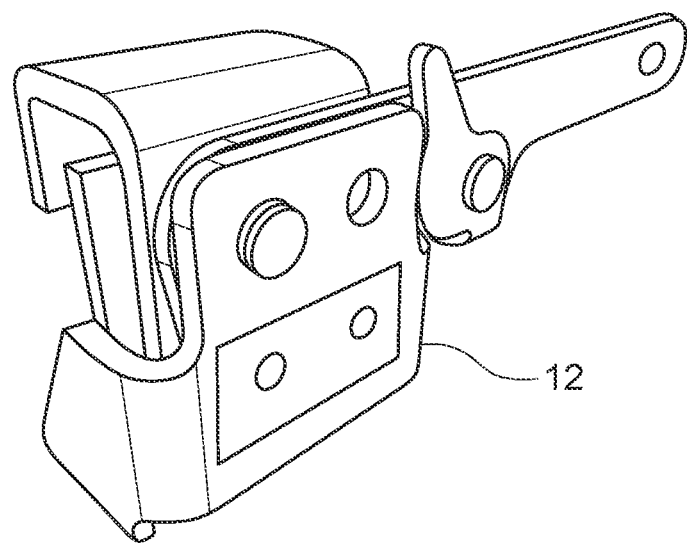

The mining industry uses a variety of railcars and associated lids and latches based on industry legacy and latest improvements. Lid sizes and shapes vary from round manholes to longitudinal openings. The industry has trended toward the longitudinal openings over time to allow for larger spouts and higher loading rates. FIGS. 1a and 1b illustrate a conventional upper lid 10 in opened and closed positions, while FIGS. 2a and 2b illustrate latches 12 according to a conventional latch design common in the industry, such as the IRECO 30149 latch.

Railcar lids have traditionally been unlatched and opened by hand, an operation which requires the operator to access the top of the railcar. Due to corrosion, latches may also be seized requiring additional effort and/or use of hammers to loosen. Ice and snow create additional obstacles and hazards on the running boards and can lead to strain-type injuries as operators attempt to pry the lids open. Lid materials have evolved to adopt fiberglass and aluminium to increase longevity while reducing weight compared to steel lids, however, the progression to longitudinal lids has increased the lid size and hence the weight, making manual operation even more difficult. As described herein, operators are not required to be on top of the railcars to manually manipulate the lids and latches, thus reducing these risks.

Figure 3:
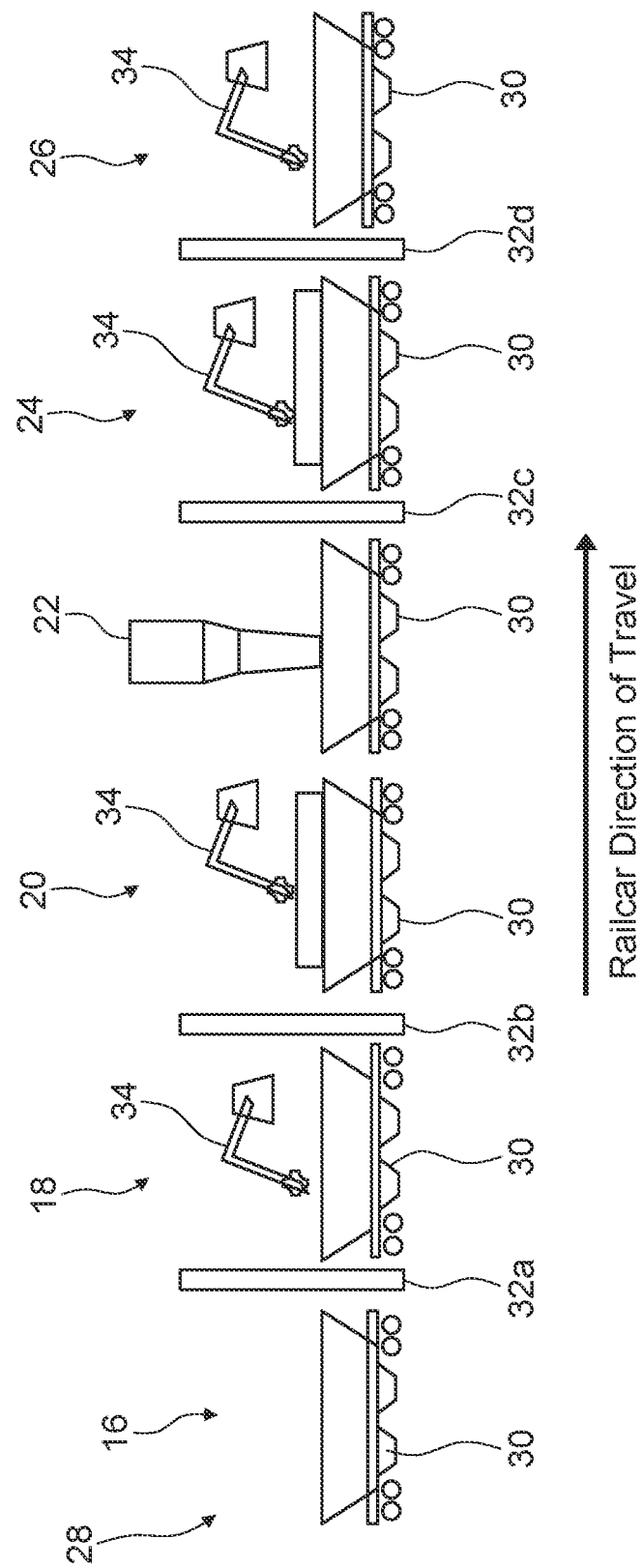
FIG. 3 is a schematic view of a railcar loading system.

FIG. 3 illustrates a loading system 14 that automatically unlatches latches 12 on lids 10 of individual railcars 30, so that each railcar 30 can be loaded with product before the lids 10 are automatically closed and latched. Once the train 28 comprising a string of railcars 30 arrives at site, the railway service provider transfers custody of the train 28 to a load-out field operator who performs the inspection of the train 28. The train 28 may then be switched to a remote control mode, and control of the train 28 may shift to the load-out control room operator who starts advancing the train 28 toward the loading system 14.

As the railcars enter a loading facility along a rail and the loading system 14, each individual railcar 30 can enter a de-icing station 16. In the de-icing station 16, the railcars 30 of the train 28 may be assessed using an automated scanning system, such as a machine vision system, to ensure that the tops of the railcars 30 are free of snow, ice, and/or debris. If an issue is detected, a conventional de-icing system and/or brushes may be employed automatically, in response to the scanning system determination at the de-icing station 16 that there is unwanted snow, ice, and/or debris, for clearing the upper surfaces of a railcar 30 before the railcar 30 enters the loading system 14.

FIG. 3 illustrates the various stations of the loading system 14. These stations can include: a first stage having an unlatching station 18 where a robot unlatches the latches 12 on the lid 10 of a railcar 30; a second stage having a lid opening station 20 where the lid 10 of a railcar 30 is opened after the latch 12 is unlatched; a filling station 22, where product is loaded into the railcar 30; a third stage having a lid-closing station 24 where the lid 10 of the railcar 10 is once again closed; and a fourth stage having a latching station 26 where the latch 12 on the lid 10 of the railcar 30 is one again latched. In each of these stations there may be a robotic arm, and each railcar 30 passes through each station in turn as the train 28 moves continuously through the loading system 14. There may be one robotic arm 34 in each station, or more than one, depending on the design parameters for the facility. Alternatively, one robotic arm 34 may do a combination of operations, such as unlatching a lid 12 and then opening the lid 10. Each robotic arm 34 may be provided with task-specific tooling to handle its intended task.

Figure 4:
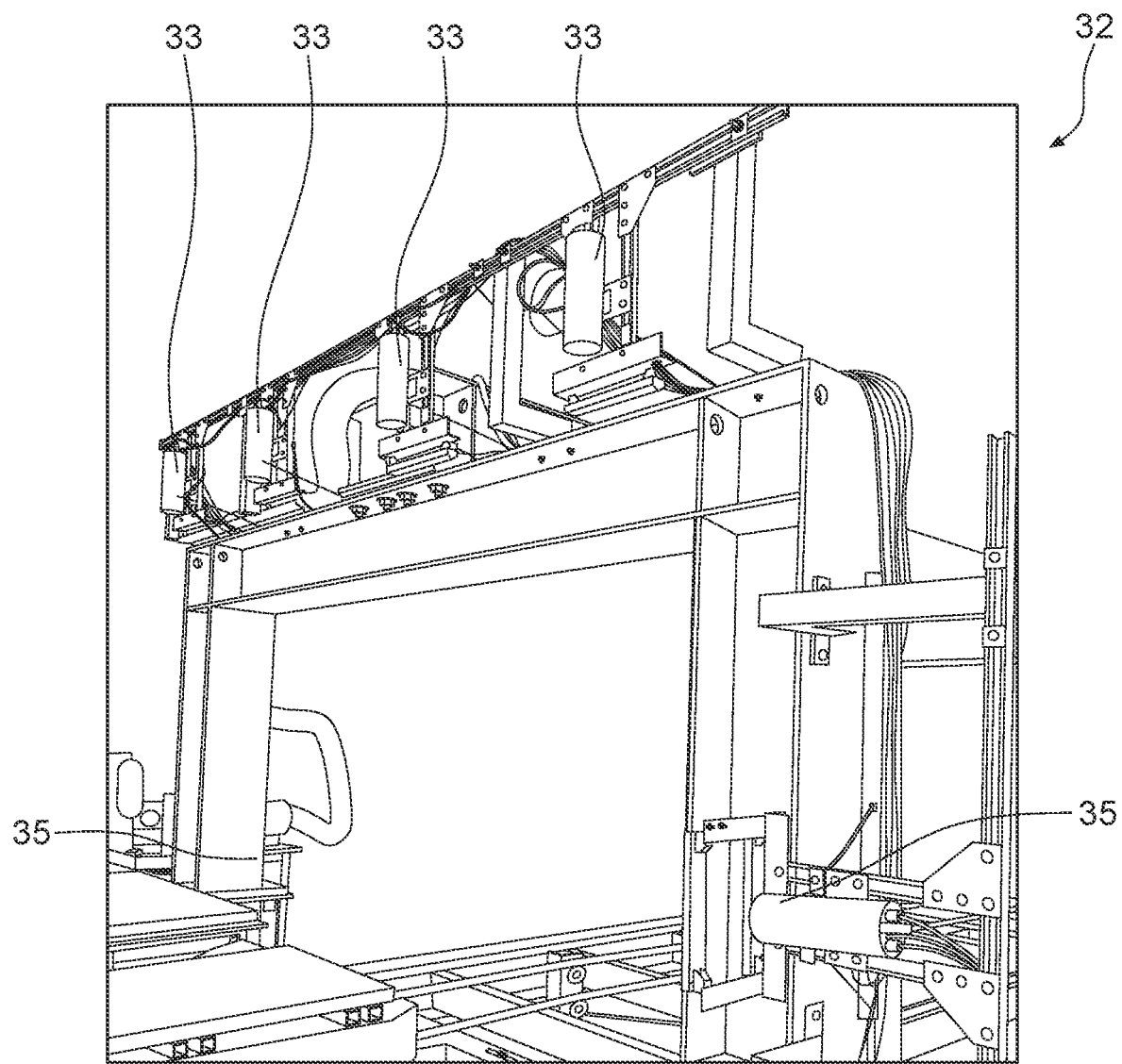
FIG. 4 is a perspective view of a machine vision system.

As each railcar 30 advances into an unlatching station 18, known herein as a first robot arm station, a first sensing system 32a may be employed to locate the lid 10 and the latch 12. FIG. 4 illustrates a sensing system 32, which could be used as first sensing system 32a. The sensing system 32 may be a machine vision system comprising a plurality of sensors, such as cameras, scanners, radar, etc. Various alternatives to the use of cameras may be used, such as laser profilometers or radar systems. In some aspects, more than 2 cameras may be employed. One or more sensors 33, such as cameras, can be positioned horizontally to aim in a first direction, aiming downwards towards a top of a railcar 30 passing by the sensing system 32, and one or more sensors 35, such as cameras, can be positioned vertically, and directed approximately 90° to the direction of the horizontally positioned one or more sensors 33, to aim towards a side of a railcar 30. By using these one or more sensors 33 aimed in the first direction and the one or more sensors 35 aimed in the second direction, substantially perpendicular to the first direction, the sensing system 32 can identify the location of the latch 12 and/or a lid 10 on a railcar 30 passing by the sensing system 32.

One sensor, such as one of the horizontally positioned sensor 33, may search for the closed latch 12 on both sides of the railcar 30 to detect which side of the lid 19 the latch 12 is positioned on. Some sensors, may locate the coordinate positions of the latch 12 along an axis parallel to the track (the X axis), such as the horizontally positioned sensors 33, and a vertical axis (the Z axis), such as the vertically positioned sensors 35, while other sensors, such as the horizontally positioned sensors 33, may determine the coordinate position of the latch 12 along a transvers axis to X (the Y axis). This X, Y and Z coordinate can be defined as the railcar coordinate system and fixed relative to the specific railcar 30. The sensors can then work together to search for the lid 10 edges and calculate the railcar 30 tilt angle using trigonometry.

The determined coordinates of the latch 12 in the railcar coordinate system is fixed relative to the individual railcar 30 so that the latch 12 always remains in the same location in the railcar coordinate system even as the railcar 30 moves along the track because the railcar coordinate system will move with the railcar 30. One skilled in the art may upon review of the present disclosure understand that alternative sensing systems may be employed providing the same or similar functionality.

As each railcar 30 passes by the first sensing system 32a for the first stage, a new railcar coordinate system can be created for each railcar 30 with the position/coordinates of the latch(es) 12 on that railcar 30 determined in its railcar coordinate system.

In this manner, the latches 12 on each railcar 30 will be located by the first sensing system 32a and their position in a railcar coordinate system that is fixed to each railcar 30 determined. The first sensing system 32a may search one or more captured images for key features against pre-defined models, such as searching for three key edges (one parallel to each of the Cartesian directions) to determine the position of the latches 12 in the railcar coordinate system.

The sensing system 32a may identify the location of the latch 12 and determine its position in a railcar coordinate system that is fixed in relation to the railcar 30. The sensing system 32a can then synchronize with and communicate the position information to a controller (not shown), which in turn directs a robotic arms 34 in the unlatching station 18 to position itself according to this position and orientation information of the latch 12 so that the robotic arm 34 can unlatch the latch 12 on the railcar 30.

Figure 5:
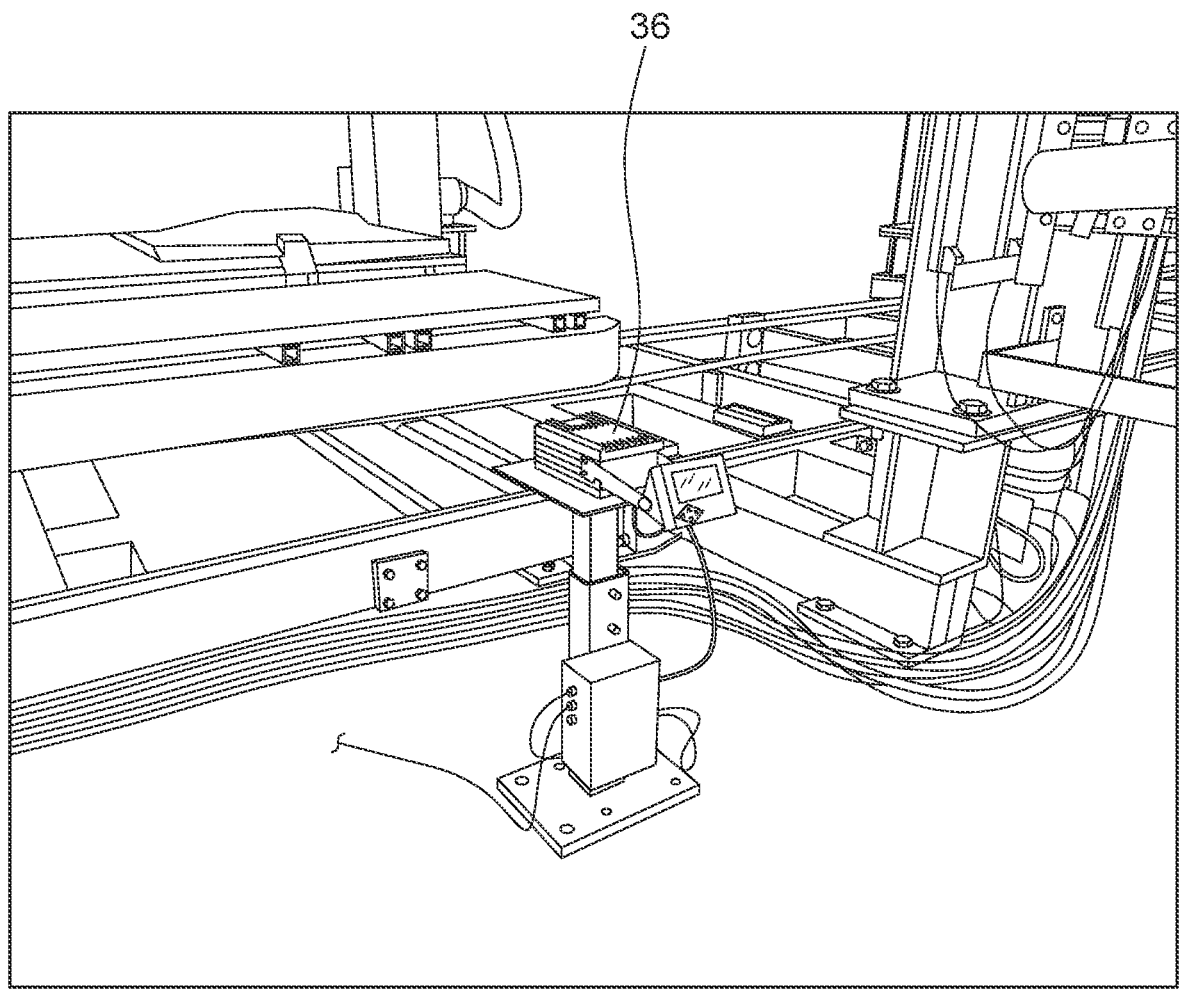
FIG. 5 is a perspective view of a velocity sensor.

Velocity sensors 36, such as laser surface velocimeters, as illustrated in FIG. 5, can be employed to measure the instantaneous velocity or moving speed of each individual railcar 30. The length of the train 28, and the slack in the railcar 30 couplings, prevents the use of a global train 28 speed signal as a feedback signal for positioning the robotic arm 34. The sensing system 32 locates where the latch 12 or lid 10 is on each railcar 30 in 3D space at a given time and can determine the position of the latch 12 in railcar coordinate system fixed to the individual railcar 30. This position information of the latch 12 can then be used so that the robotic arm 34 can be engaged with the latch 12 or lid 10 and execute an adjusted toolpath for the tooling.

When the individual railcar 30 passes one of the sensing systems 32a, 32b, 32c, 32d, the velocity sensor 36 can continue to track the latch 12 or lid 10 until it reaches a synchronization point, and when the synchronization point is reached, a synchronization signal can then be sent to the controller. From the moment of synchronization, the controller may r the instantaneous velocity signal from the velocity sensor 36 in order to determine the position of the railcar 30 along the tracks. Determining the position of the railcar 30 will thereby determine the position of the railcar coordinate system which is fixed in relation to the railcar 30.

These coordinates of a latch 12 on the railcar 30 in the railcar coordinate system can be sent to the controller for the robot arm 34 in the unlatching station 18, where this information can be used to position a latch/lid coordinate system fixed relative to the robot arm 34 in the unlatching station 18 and offset relative to the moving railcar coordinate system fixed relative to the moving railcar 30. This can allow the robotic arm 34 to execute an adjusted toolpath where the coordinates of the latch 12 in the moving railcar coordinate system and the measured velocity of the specific railcar 30 can be resolved with the latch/lid coordinate system fixed relative to the robotic arm 34 so that the robotic arm 34 can execute the adjusted toolpath in the latch/lid coordinate system and thereby follow along with railcar 30 as it moves through the system and specifically the latch 12 on the railcar 30. As the latch/lid coordinate system tracks the motion of the railcar 30 (via the velocity sensors 36), the robotic arm 34 can follow the adjusted toolpath and move along with the latch 12 on the railcar 30 allowing the robotic arm 34 to unlatch the latch 12 as the railcar 30 moves dynamically along the tracks.

Figure 7A:
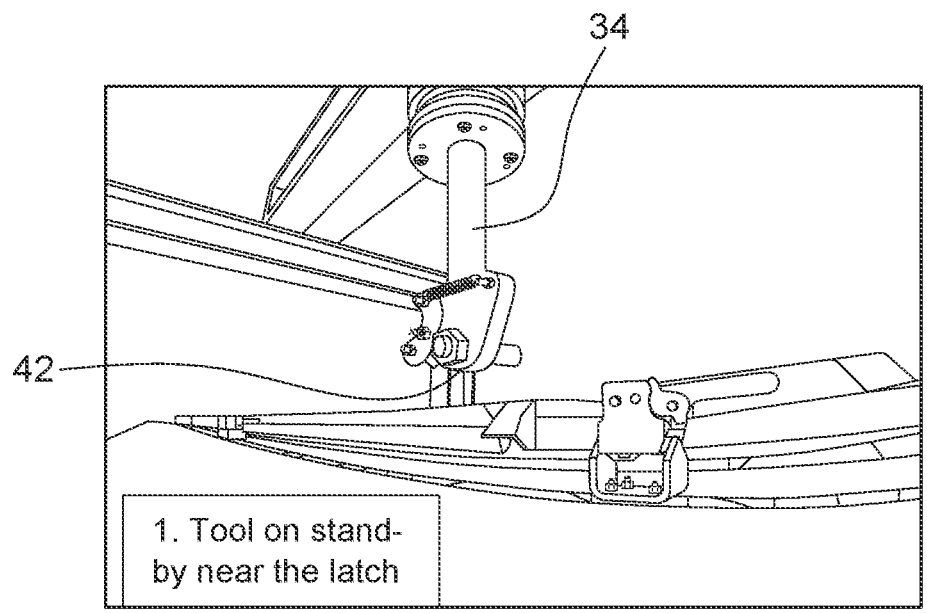
FIGS. 7a to 7d illustrate a lid unlatching sequence.

Referring to FIGS. 7a to 7d, an unlatching process at the unlatching station 18 is illustrated; note that the Figures are taken from operation of a prototype that was constructed to test the system, and thus only the lids and latches are shown rather than whole railcars. In FIG. 7a, the robotic arm 34 with unlatching tooling 42 is in the standby position, but near the latch 12. Having passed the first sensing system 32a, which side the closed latch 12 is on will be known, thus enabling the robotic arm 34 to position itself on the correct side to engage the latch 12. Having determined the location and orientation of the latch 12 and its position in the railcar coordinate system using the sensing system 32a, the robotic arm 34 can be directed to follow the adjusted toolpath so that the robotic arm 34 can move adjacent to the latch 12 and move along with the latch 12 as the railcar 30 moves through the unlatching station 18.

Figure 7B:
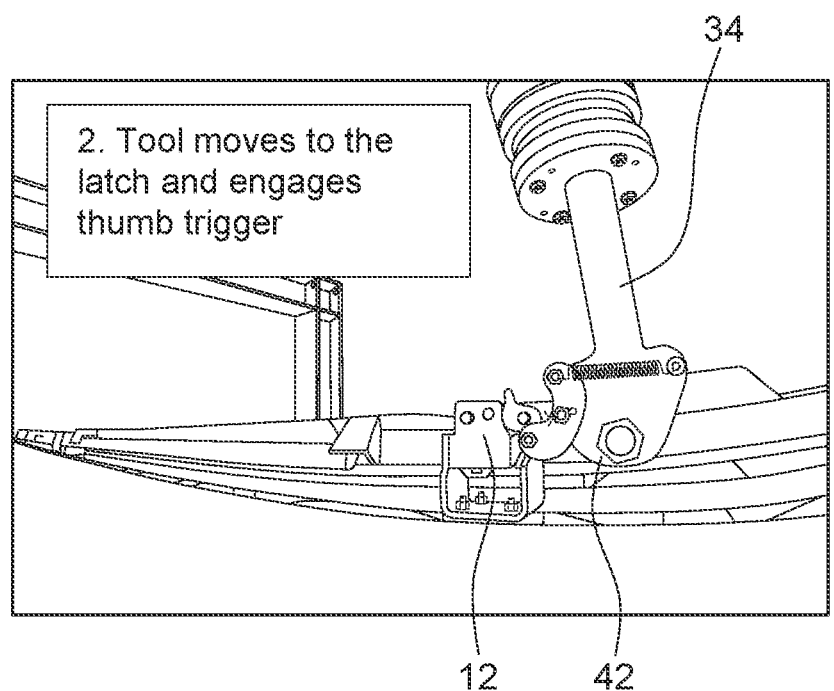
Figure 7C:
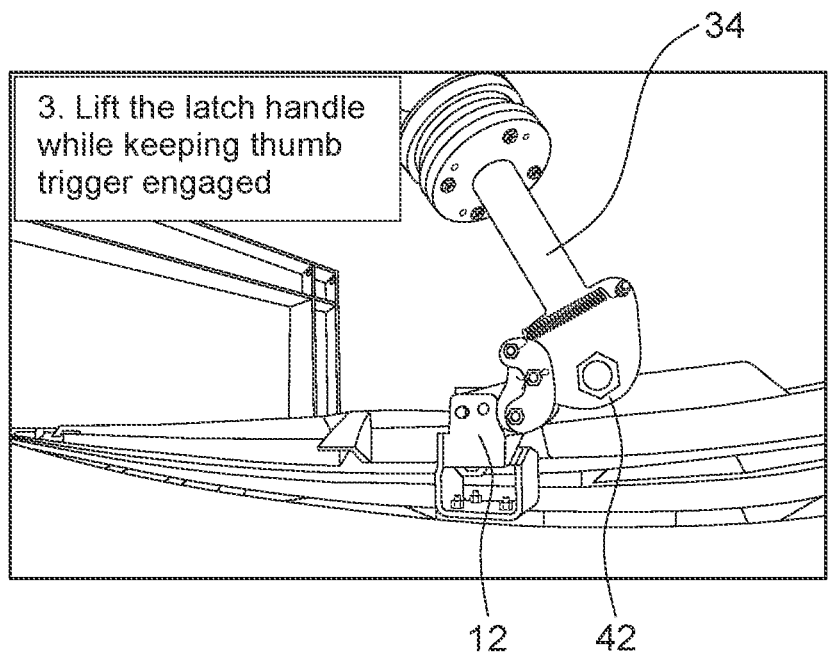
Figure 7D:
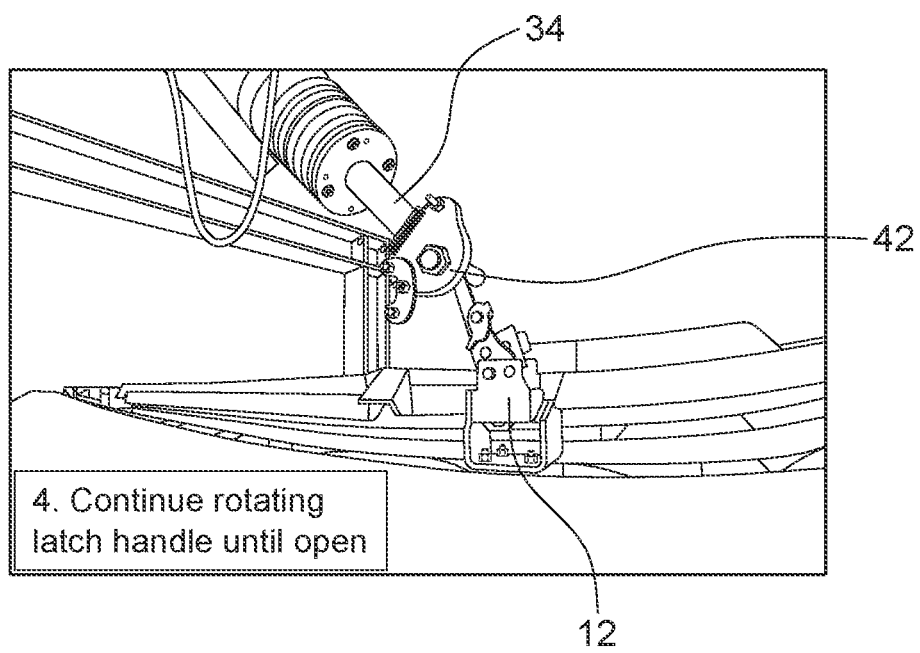
Figure 7E:
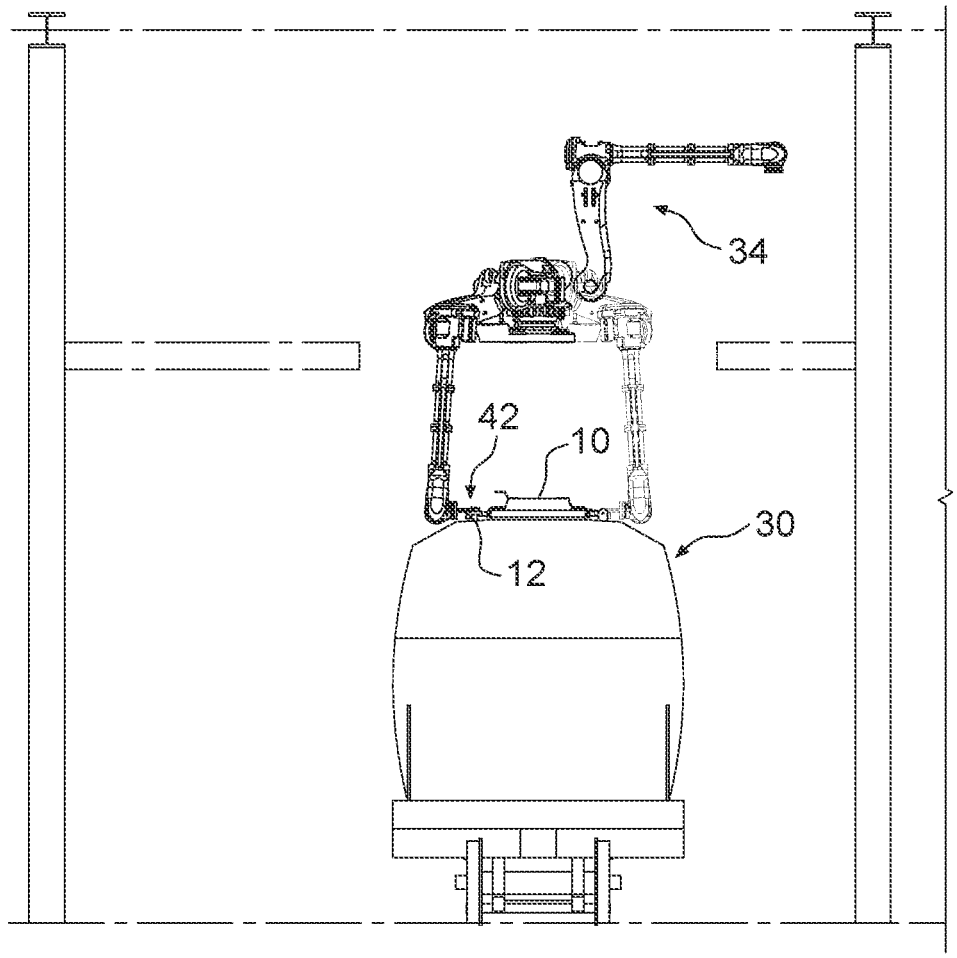
FIG. 7e is an elevation view of a robotic arm unlatching a lid.

As the robotic arm 34 moves along the adjusted toolpath and maintains a position adjacent to the latch 12, the robotic arm 34 can engage the unlatching tooling 42 with the thumb trigger of the latch 12, as shown in FIG. 7b. FIG. 7c shows the unlatching tooling 42 being used to lift the latch 12 handle while keeping the thumb trigger engaged, and FIG. 7d shows the latch 12 handle continuing to be rotated until open. The latch 12 is now disengaged and the railcar 30 can move into the lid opening station 20.

In a further aspect, there may be multiple velocity sensors 36 for each robotic arm 34 to provide a redundant and/or continuous velocity signal of each railcar 30.

Figure 6:
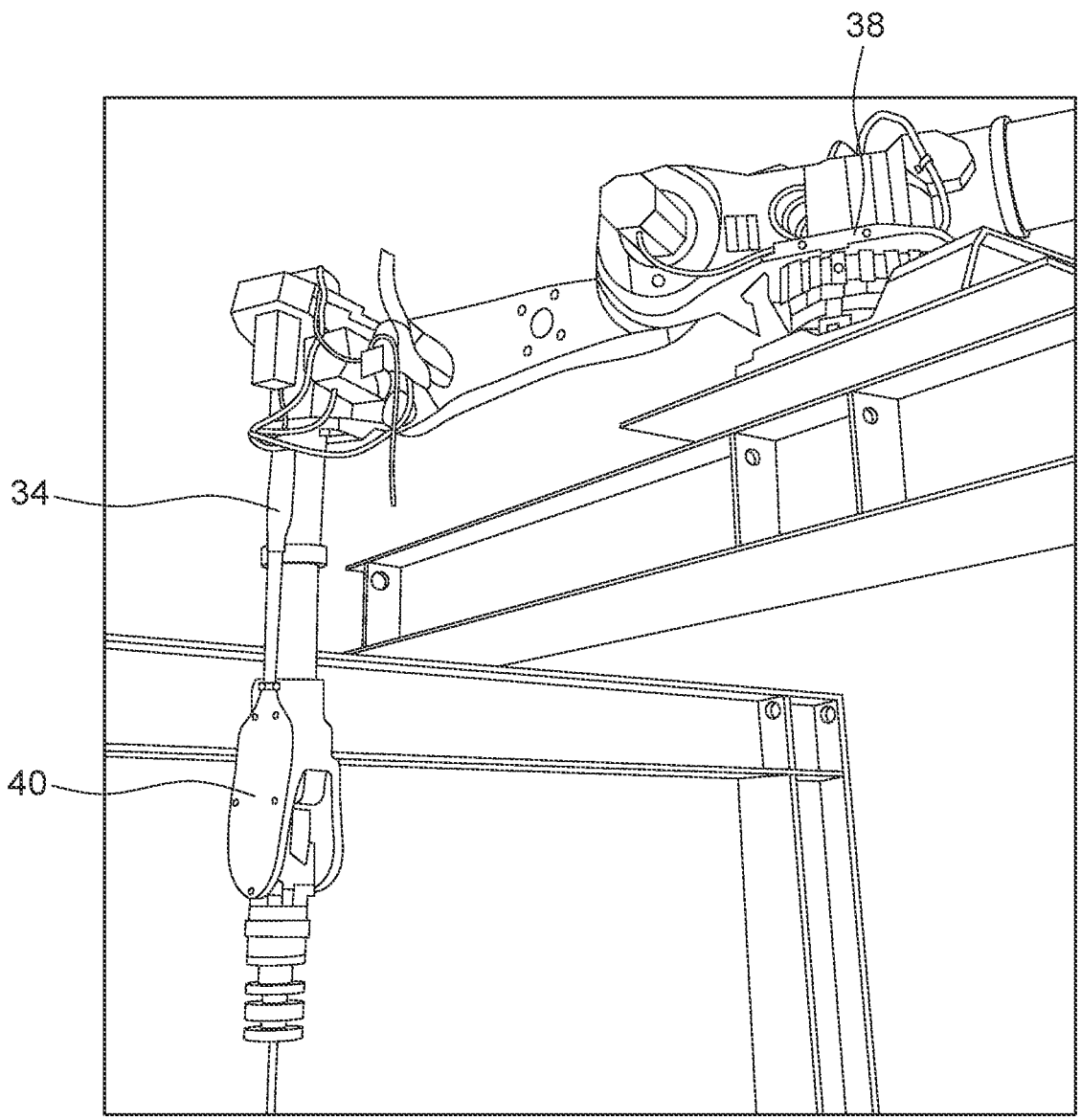
FIG. 6 is a perspective view of a robotic arm showing the tool end positioned below the arm base.

Various commercially available robotic arms may be employed, such as a robotic arm available from ABB™, Kuka™, Fanuc™ or others. The robotic arms 34 may be positioned overhead of the railcar 30, providing clearance but also a centralized location that can adapt to whichever side of the railcar 30 the latch 12 is located on. As shown in FIG. 6, each robotic arm 34 may comprise a base 38 and a tool arm 40, the latter for supporting the task-specific tooling. As can be seen, the robotic arm 34 allows for the base 38 to be positioned above the railcar 30 passageway, while the tool arm 40 can extend downwardly to engage the lid 10 or latch 12, as the case may be.

Between adjacent lids or latches, there can be a buffer period during which the robotic arm 34 can move into a standby position in preparation for executing the set toolpath.

Once the latch(es) 12 has been unlatched in the unlatching station 18, the railcar 30 can enter the second stage with the lid opening station 20. Referring now to FIGS. 8a to 8d, the steps performed in the lid opening station 20 are illustrated. As the railcar 30 passes the second sensing system 32b, the coordinates of the lid 10 and the edges of the lid 10 can be determined in the railcar coordinate system and the railcar 30 tilt and a velocity sensor 36 can measure the speed of the railcar 30. These coordinates of the lid 10 on the railcar 30 in the railcar coordinate system and the measured velocity of the railcar 30 can be sent to the controller for the robot arm 34 in the lid opening station 20, where this information can be used to position a latch/lid coordinate system fixed relative to the robot arm 34 in the lid opening station 20 and offset relative to the moving railcar coordinate system fixed relative to the moving railcar 30. This can allow the robotic arm 34 to execute an adjusted toolpath and move along with the moving lid 10 so that the robotic arm 34 can open the lid 10 on the railcar 30.

Figure 8A:
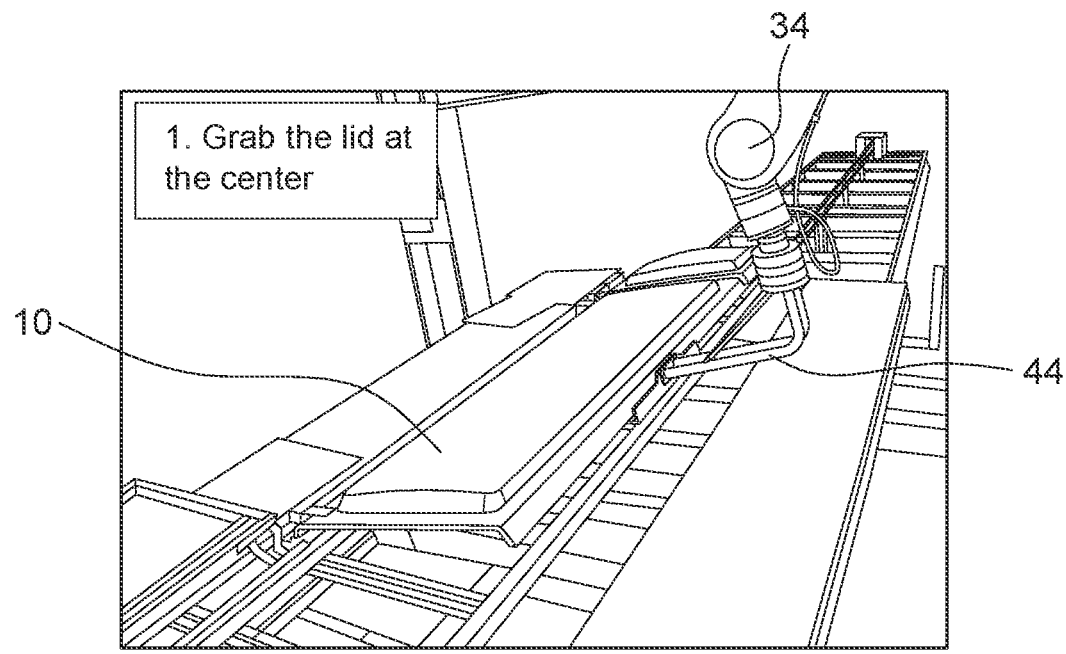
FIGS. 8a to 8d illustrate a lid opening sequence.
Figure 8B:
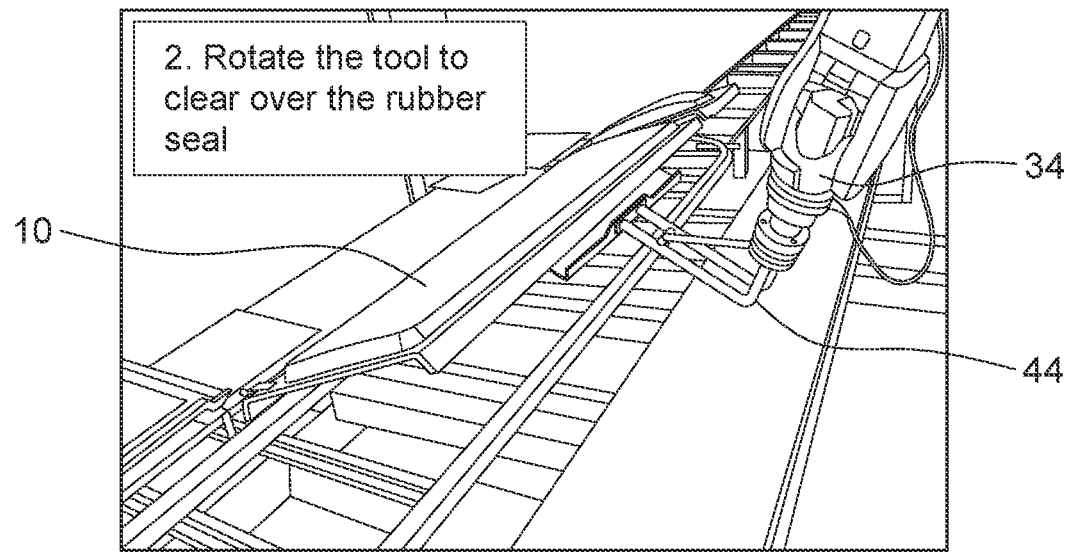
Figure 8C:
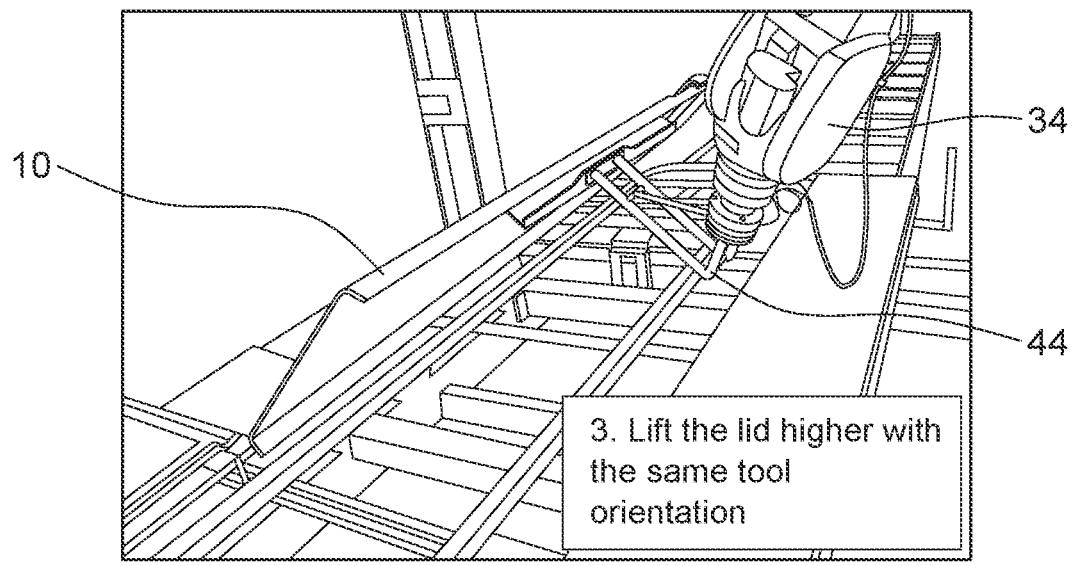
Figure 8D:
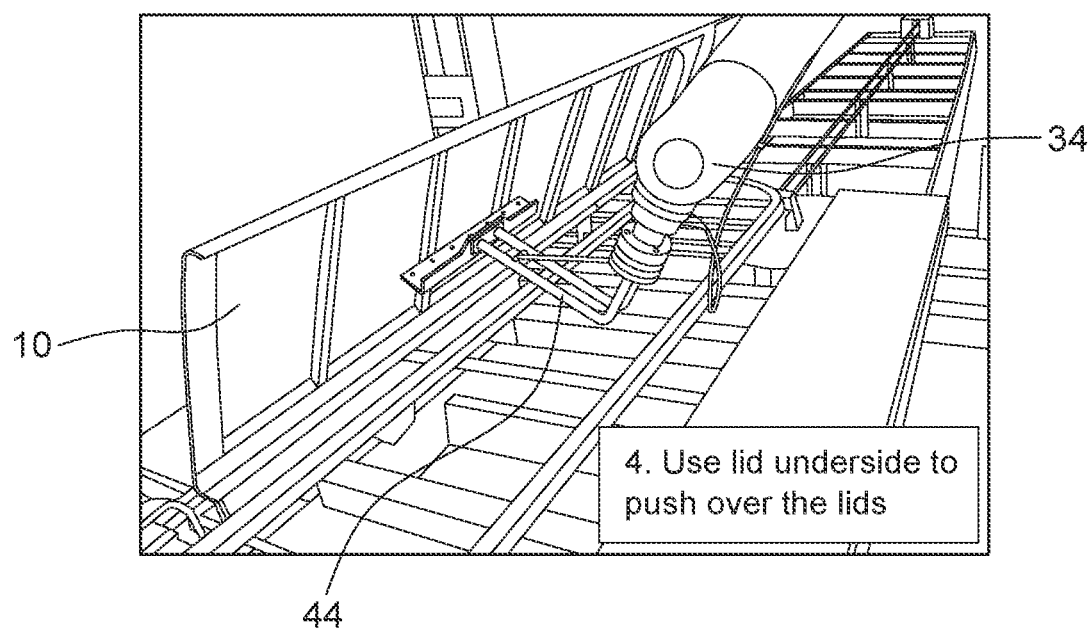

As shown in FIG. 8a, the robotic arm 34 can move into position to engage the edge of the lid 10 with tooling 44. As shown in FIG. 8b, the robotic arm 34 can rotate the tooling 44 to clear any rubber seal while following the adjusted toolpath, and FIG. 8c shows the robotic arm 34 continuing to open the lid 10 while following the adjusted toolpath. Finally, FIG. 8d shows the robotic arm 34 being used to push against the underside of the lid 10 to push it into the fully opened position.

Figure 8E:
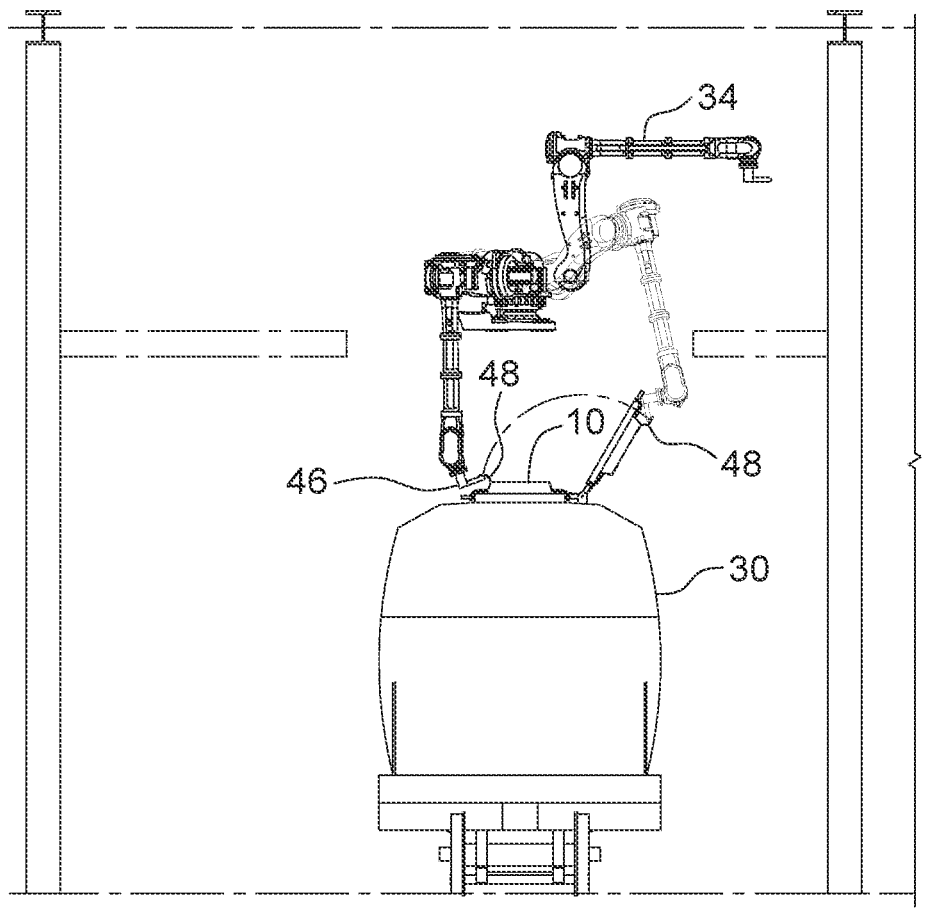
FIG. 8e is an elevation view of a robotic arm opening a lid.

FIG. 8e illustrates an alternative embodiment in which lid opening tooling 46 engages a lip 48 on the upper surface of the lid 10, and thus the tooling 46 remains engaged with the lip 48 throughout opening of the lid 10.

Once the lid 10 has been unlatched and opened, the railcar 30 interior may be exposed and ready for filling with product, and the railcar 30 moves into the loading or filling station 22.

Before the railcar 30 is filled with product, in one aspect, the railcar 30 interior may be first scanned to confirm that all lids have been opened and the bottom gates are closed. The interior of the railcar 30 can also be scanned to ensure the interior is clean and empty before the railcar 30 is loaded with product. The scanning may use a number of different techniques, such as radar scanning which can occur even before the railcar 30 enters the filling or loading stations.

Figure 9:
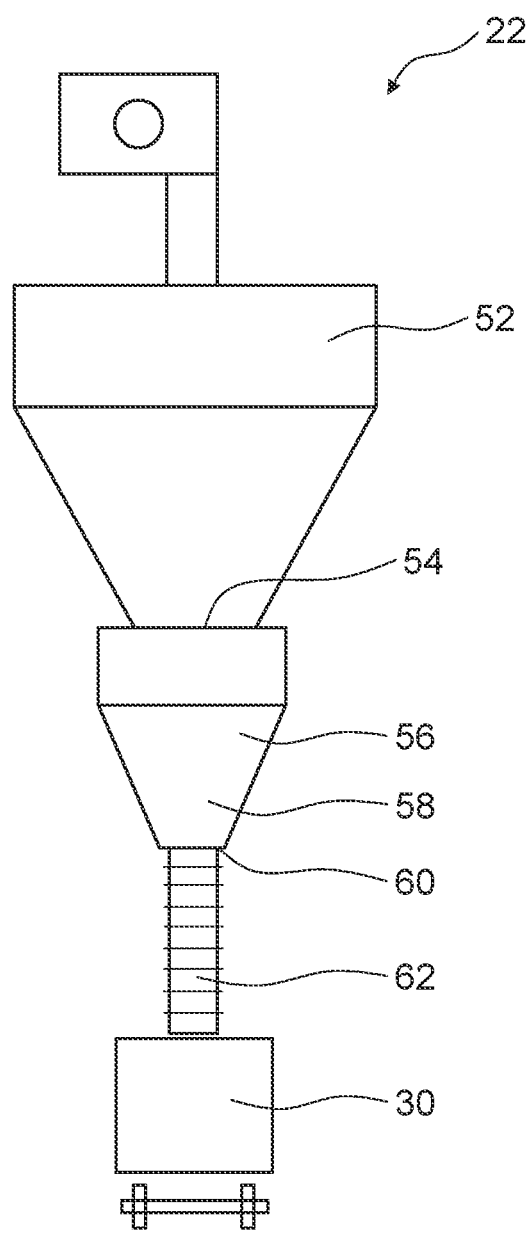
FIG. 9 is an schematic view of a loading zone.

Referring to FIG. 9, the filling station 22 is shown. Product is introduced into a surge bin 52 before passing through a charging gate 54 into a weigh bin 56. The weigh bin 56 may be instrumented with load cells 58. A discharge gate 60 may allow for product to move downwardly from the weigh bin 58 into the loading chute or filling spout 62. The filling spout 62 may be telescopic and lowers into the railcar 30 and deposits pre-weighed discharges of product into the railcar 30 interior, filling each railcar 30 to a set capacity. Note that the filling spout 62 does not move with the railcar 30, but rather discharges the material into the longitudinal opening at the top of the railcar 30 as the railcar 30 passes through the loading or filling station 22.

Once the railcar 30 has been filled to capacity, the railcar 30 continues moving forward into the lid-closing station 24. FIGS. 10a to 10d illustrate stages of the lid-closing procedure. A third sensing system 32c may be located at this station. As the railcar 30 passes by the third sensing system 32c, sensors, such as cameras, in the third sensing system 32c can scan the railcar 30 for a physical indicator, e.g., the tongue of an open lid 10, to determine the location or coordinates of the lid 10 in the railcar coordinate system, and a velocity of the individual railcar 30 can be measured by a velocity sensor 36. The third sensing system 32 may also determine which direct the lid 10 closes.

Figure 10A:
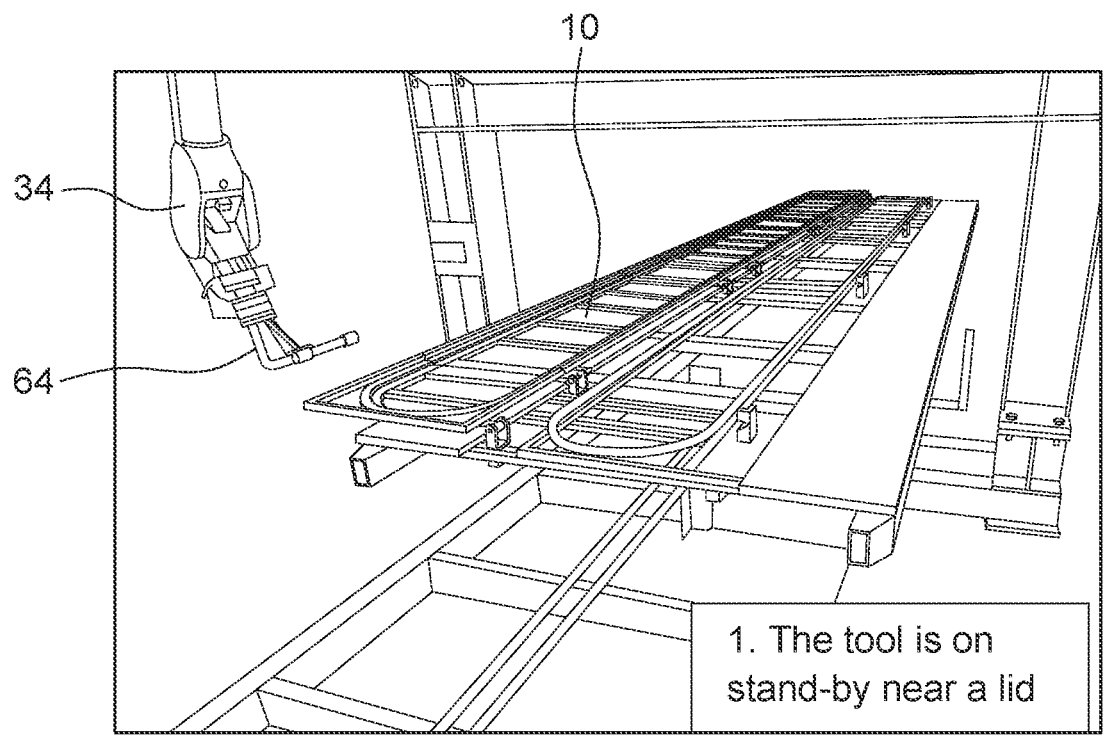
FIGS. 10a to 10d illustrate a lid closing sequence.
Figure 10B:
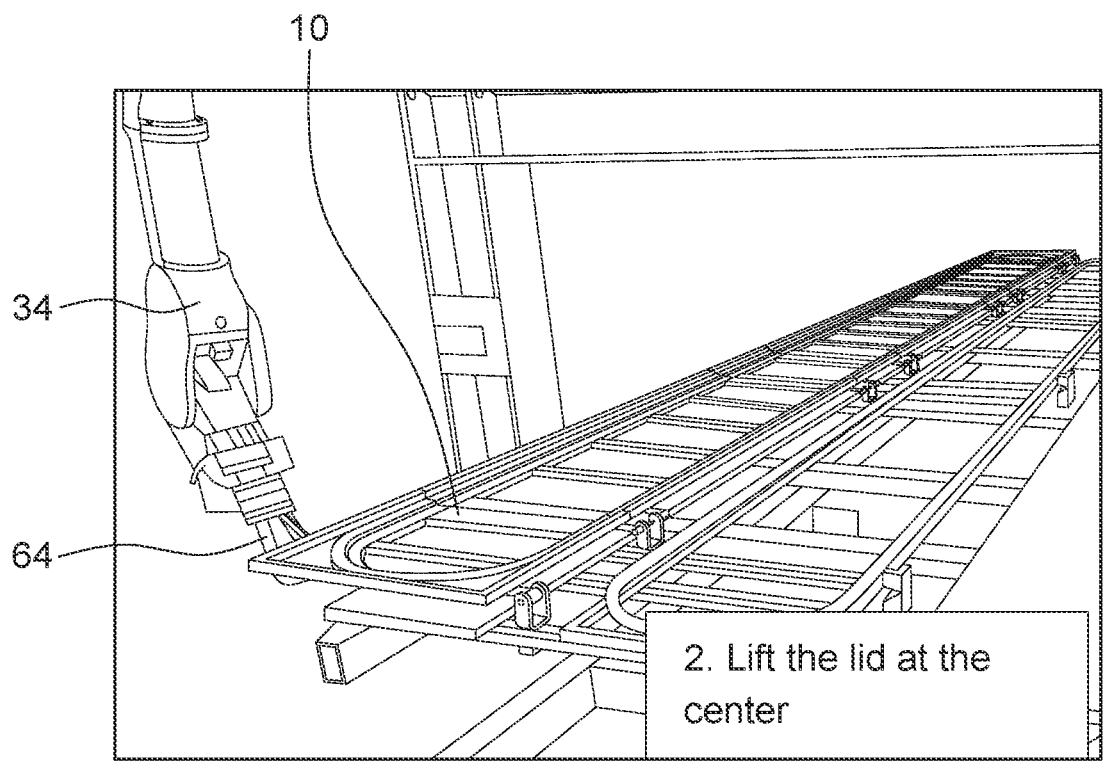
Figure 10C:
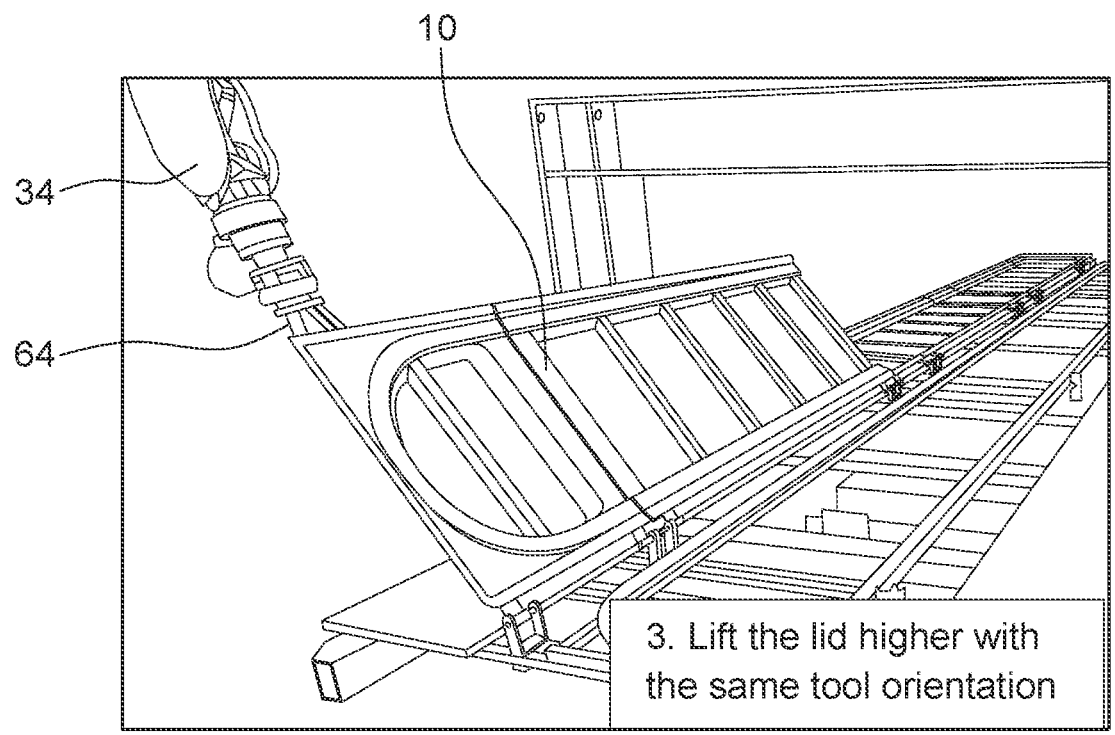
Figure 10D:
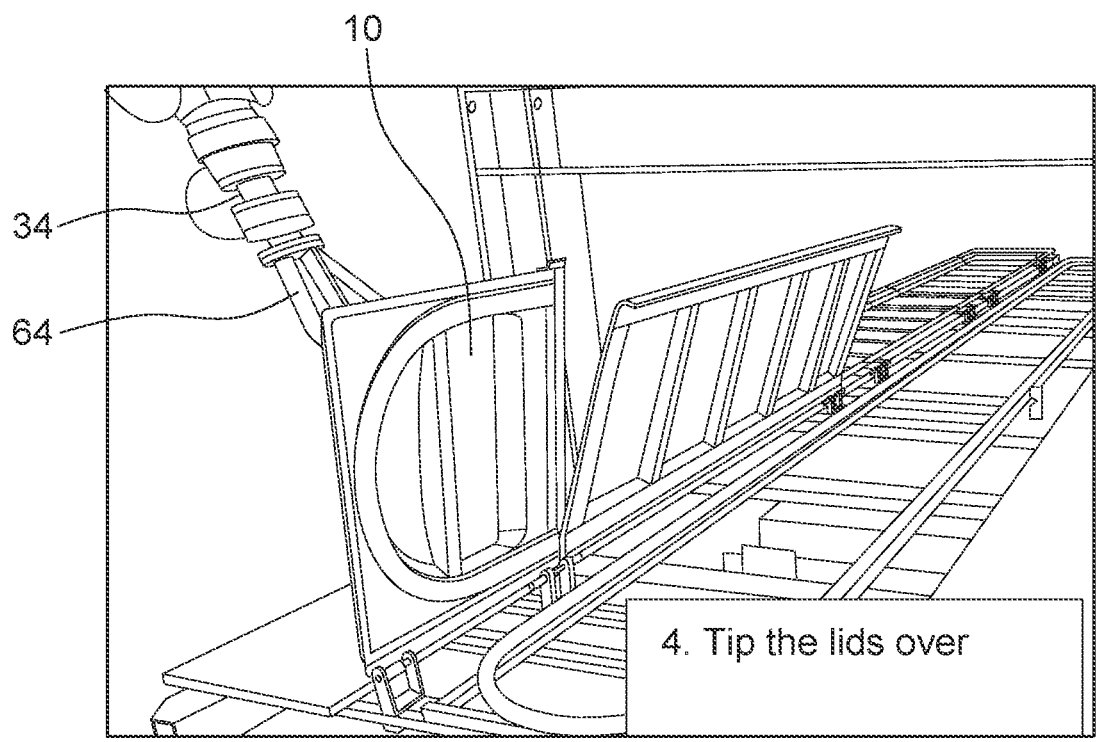
Figure 11A:
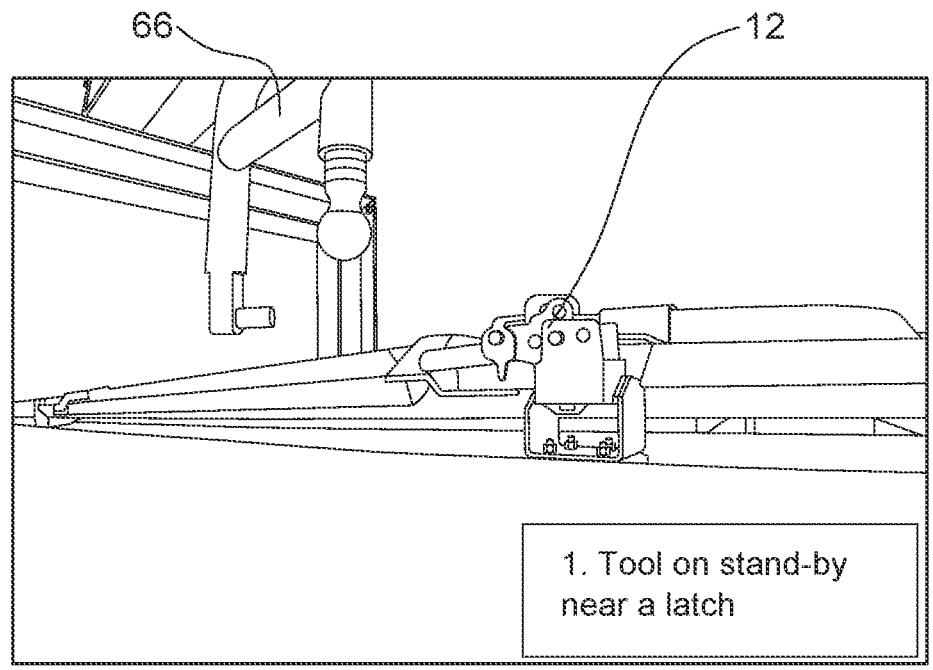
FIGS. 11a to 11d illustrate a lid latching sequence.
Figure 11B:
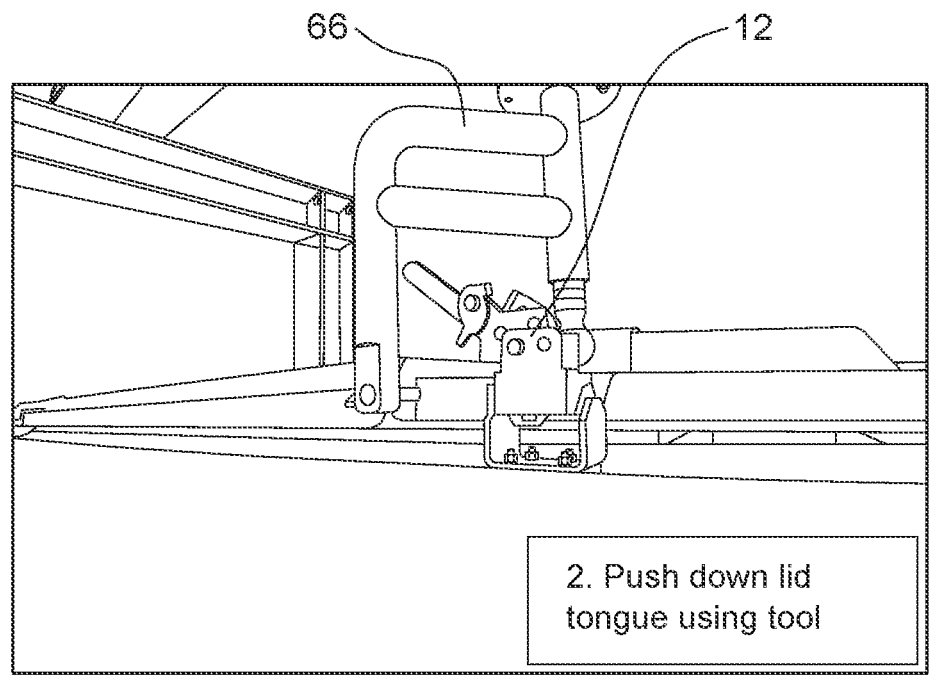
Figure 11C:
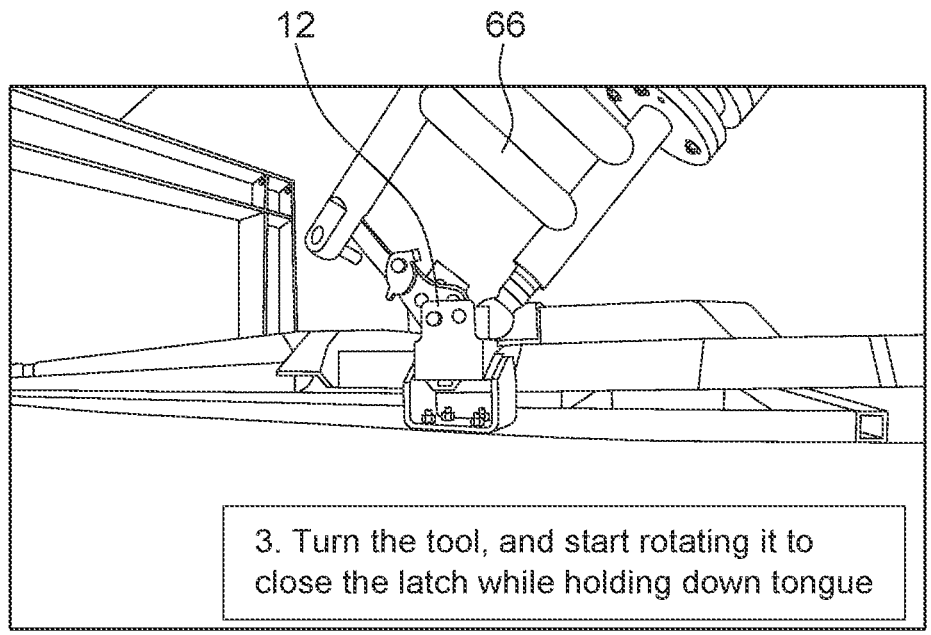
Figure 11D:
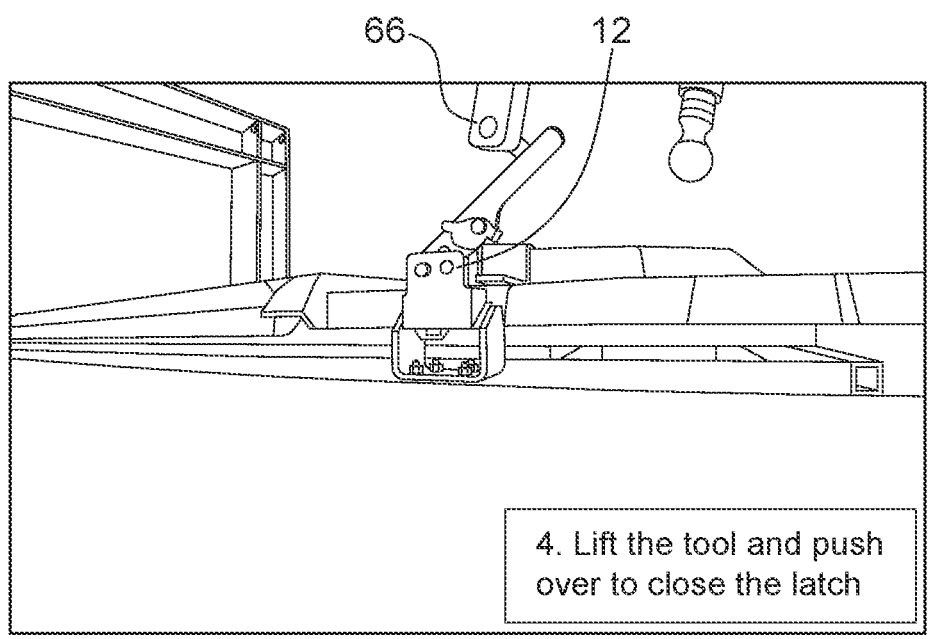
Figure 11E:
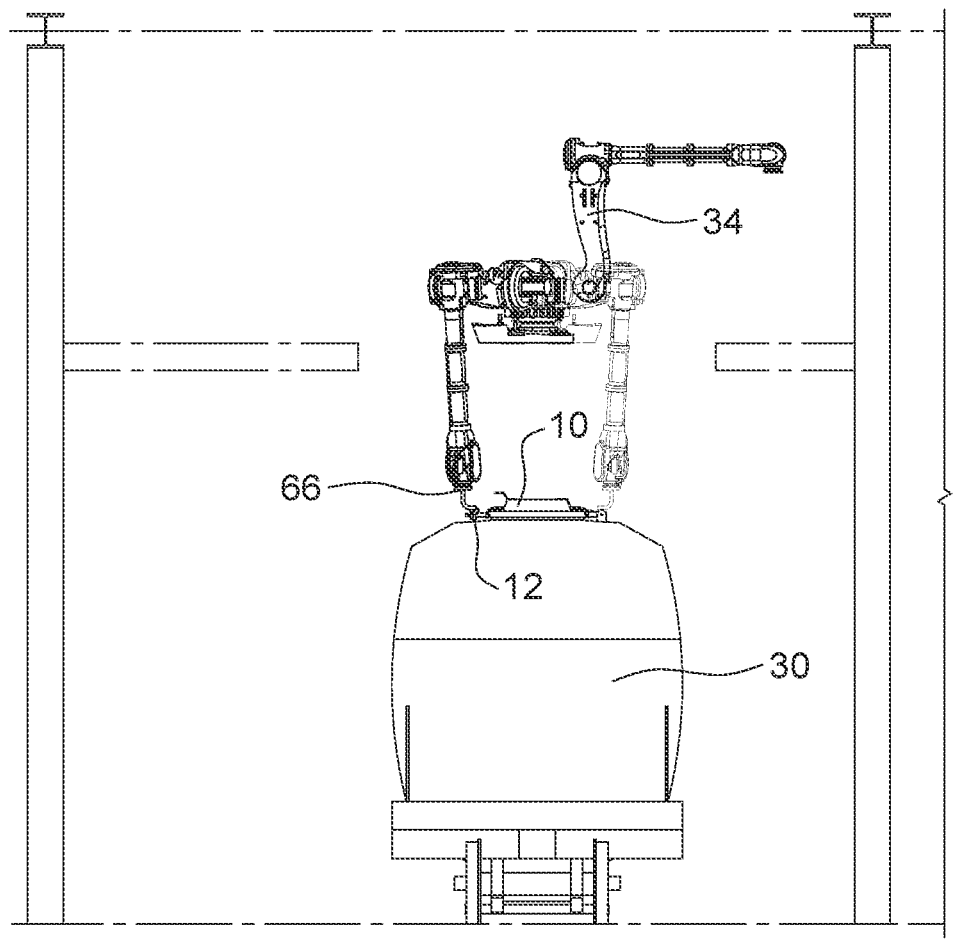
FIG. 11e is an elevation view of a robotic arm latching a lid.
Figure 11F:
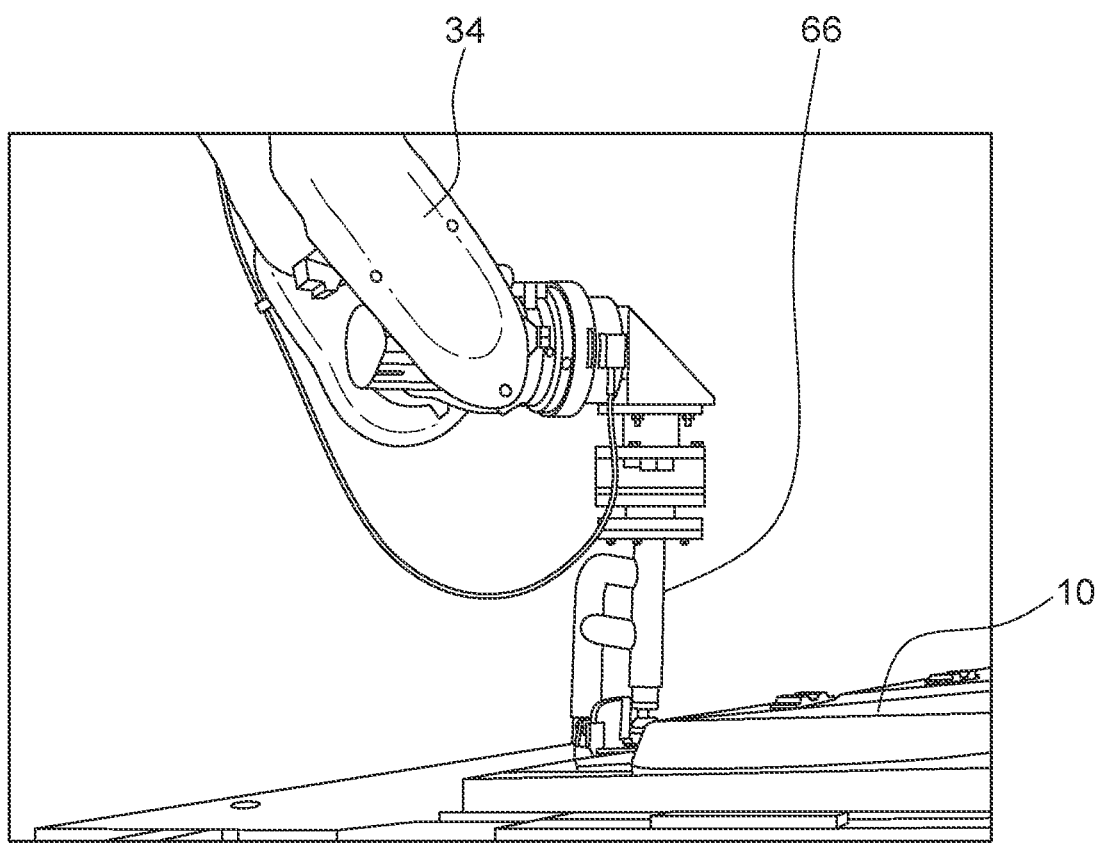
FIG. 11f is a perspective view of a robotic arm latching a lid.

These coordinates of the lid 10 on the railcar 30 in the railcar coordinate system and the measured velocity of the railcar 30 can be sent to the controller for the robot arm 34 in the lid-closing station 24, where this information, along with the measured velocity of the railcar 30, can be used to position a latch/lid coordinate system fixed relative to the robot arm 34 in the lid-closing station 24 and offset relative to the moving railcar coordinate system fixed relative to the moving railcar 30. This can allow the robotic arm 34 to execute an adjusted toolpath where the coordinates of the lid 10 in the moving railcar coordinate system and the measured velocity of the specific railcar 30 can be resolved with the latch/lid coordinate system fixed relative to the robotic arm 34 in the lid-closing station 24 so that the robotic arm 34 can execute the adjusted toolpath in the latch/lid coordinate system and thereby follow along with railcar 30 as it moves through the system and specifically the lid 10 on the railcar 30. As the latch/lid coordinate system tracks the motion of the railcar 30 (via the velocity sensors 36), the robotic arm 34 with task-specific tooling 64 moves into standby position as shown in FIG. 10a. When the railcar 30 and the lid 10 of the railcar 30 moves into range of the robotic arm 34, the robotic arm 34 can follow the adjusted toolpath, moving the tooling 64 adjacent to the moving lid 10, and the tooling 64 on the robotic arm 34 can engage the underside of the opened lid 10 as shown in FIG. 10b. Referring to FIG. 10c, continued upward movement of the tooling 64 rotates the lid 10 until the lid 10 begins moving downwardly as shown in FIG. 10d toward a closed orientation.

With the railcar 30 filled with product and the lid 10 closed, the remaining action is to latch the lid 10 in a closed and secured state in the latching station 26. Turning now to FIGS. 11a to 11f, a latching procedure is illustrated. There can be a fourth sensing system 32d at the latching station 26.

As the railcar 30 passes by the fourth sensing system 32d, sensors, such as cameras, in the fourth sensing system 32d can scan the railcar 30 for which side of the railcar 30 the latch 12 is placed on and the position of the latch 12 on the railcar 30. The sensors of the fourth sensing system 32d may be used to determine the X, Y and Z coordinates of the latch 12 on the lid 10, and the sensors can be used together to locate the lid 10 edges and determine a tilt of the railcar 30. Using this location information, the sensors in the fourth sensing system 32d can be used to determine the location or coordinates of the latch 12 and/or the lid 10 in the railcar coordinate system.

These coordinates of the latch 12 and/or the lid 10 on the railcar 30 in the railcar coordinate system can be sent to the controller for the robot arm 34 in the latching station 26, where this information can be used to position a latch/lid coordinate system fixed relative to the robot arm 34 in the latching station 26 and offset relative to the moving railcar coordinate system fixed relative to the moving railcar 30. This can allow the robotic arm 34 in the latching station 26 to execute an adjusted toolpath where the coordinates of the latch 12 in the moving railcar coordinate system and the measured velocity of the specific railcar 30 can be resolved with the latch/lid coordinate system fixed relative to the robotic arm 34 in the latching station 26 so that the robotic arm 34 can execute the adjusted toolpath in the latch/lid coordinate system and thereby follow along with railcar 30 as it moves through the system and specifically the latch 12 on the railcar 30. As the latch/lid coordinate system tracks the motion of the railcar 30 (via the velocity sensors 36), the robotic arm 34 can follow the adjusted toolpath, moving along with the moving latch 12, and tooling 66 on the robotic arm 34 can re-latch the latch 12 securing the lid 10 on the railcar 30 closed once again.

As will be clear to those skilled in the art upon review of the present disclosure, the specific type of tooling and the requisite toolpath programming may be determined by the latch or lid that is present on a railcar, and the sensing system 32a may be programmed with the various latch types so that the sensing system 32 can recognize the particular latch, identify a suitable tool, and execute the correct toolpath. If a train is going to arrive that has railcars with two different latch or lid types requiring two different tooling types, for example, a number of robotic arms could be employed, each with the tooling appropriate to one of the incoming latch or lid types, they could be deployed accordingly once the sensing system detects the latch or lid type. In some aspects, standardization in latch or lid type may simplify the tooling selection.

In another aspects, tooling may engage with more than one style of lid or latch, but with a differing toolpath for each lid/latch type. Further, the robotic arm may have a variety of tools from which can select based on the incoming lid/latch, and a coupling such as a quick-release mechanism to enable engagement of the robotic arm with the selected tool as the railcar approaches the station.

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to".

"connected", "coupled", or any variant thereof, means any connection or coupling, either direct or indirect, between two or more elements; the coupling or connection between the elements can be physical, logical, or a combination thereof.

"herein", "above", "below", and words of similar import, when used to describe this specification shall refer to this specification as a whole and not to any particular portions of this specification.

"or", in reference to a list of two or more items, covers all of the following interpretations of the word: any of the items in the list, all of the items in the list, and any combination of the items in the list.

the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, etc.) is referred to herein, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of methods and apparatus have been described herein for purposes of illustration. These are only examples. The technology provided herein can be applied to contexts other than the exemplary contexts described above. Many alterations, modifications, additions, omissions and permutations are possible within the practice of this invention. This invention includes variations on described embodiments that would be apparent to the skilled person, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The foregoing is considered as illustrative only of the principles of the invention. The scope of the claims should not be limited by the exemplary embodiments set forth in the foregoing, but should be given the broadest interpretation consistent with the specification as a whole.

What is claimed is:

1. A railcar operation system for performing an operation on a moving railcar in a string of railcars, the moving railcar having a latch and a lid, comprising:
   a sensing system for detecting a position of at least one of: the latch; and the lid, on the moving railcar;
   at least one velocity sensor for measuring a moving speed of the moving railcar separate from other railcars in the string of railcars;
   a robot arm for executing the operation on the at least one of: the latch; and the lid; and
   at least one controller for using a measured moving speed of the moving railcar with the position of the at least one of: the latch; and the lid, to generate commands to instruct the robot arm, wherein the robot arm, in response to the commands from the at least one controller, executes an adjusted toolpath to follow the moving railcar and to engage with the at least one of: the latch; and the lid, for performing the operation while the railcar is moving.

2. The railcar operation system of claim 1, further comprising a scanning system installed above the railcar for scanning the moving railcar.

3. The railcar operation system of claim 1, wherein the robot arm comprises a task-specific tolling configured to perform the operation of at least one of: unlatching the latch, latching the latch, opening the lid, and closing the lid.

4. The railcar operation system of claim 1, wherein the operation is at least one of: unlatching the lid; opening the lid; closing the lid; and latching the latch.

5. The railcar operation system of claim 1, wherein the sensing system comprises a plurality of cameras for detecting a coordinate position of the at least one of: the latch; and, the lid, relative to a railcar coordinate system, the railcar coordinate system fixed relative to the moving railcar.

6. The railcar operation system of claim 5 wherein at least one of the plurality cameras is positioned to aim in a first direction, downwards towards a top of the railcar, and wherein at least one of the plurality of cameras is positioned to aim in a second direction, towards a side of the railcar.

7. The railcar operation system of claim 6 wherein the first direction is substantially perpendicular to the second direction.

8. The railcar operation system of claim 5, wherein the at least one controller uses the moving railcar coordinate system, the measured moving speed of the moving railcar, and a latch/lid coordinate system to determine the adjusted toolpath, the latch/lid coordinate system fixed relative to the robot arm.

9. The railcar operation system of claim 8, wherein the at least one controller integrates the measure moving speed to determine a position of the moving railcar.

10. The railcar operation system of claim 9, wherein the position of the moving railcar coordinate system is determined by finding the position of the moving railcar.

11. The railcar operation system of claim 8, wherein the at least one controller uses the moving railcar coordinate system, the measured moving speed of the moving railcar, and the latch/lid coordinate system to determine the adjusted toolpath in response to receiving a synchronization signal.

12. The railcar operation system of claim 8, wherein the at least one controller determines the position and orientation of the latch and the lid in the latch/lid coordinate system.

13. The railcar operation system of claim 12, wherein the adjusted toolpath is executed relative to the latch/lid coordinate system.

14. A method for performing an operation on a moving railcar in a string of railcars, the moving railcar having a latch and a lid, the method comprising:
  detecting a position of at least one of: the latch; and, the lid, on the moving railcar;
  measuring a moving speed of the moving railcar separate from other railcars in the string of railcars;
  using the measured moving speed of the moving railcar and the position of the at least one of: the latch, and, the lid, to determine an adjusted toolpath;
  having a robot arm execute the operation on the at least one of: the latch; and, the lid, while the railcar is moving by following the adjusted toolpath.

15. The method of claim 14, wherein the operation comprises any one of: unlatching the latch; latching the latch; opening the lid; and, closing the lid.

16. The method of claim 14, further comprising identifying a type of the latch and a type of lid before detecting the position.

17. The method of claim 14, wherein the step of measuring the moving speed of the moving railcar comprises measuring an instantaneous velocity of the moving railcar.

18. The method of claim 14, wherein the step of detecting the position of the at least one of: the latch; and, the lid, further comprises detecting a coordinate position of the at least one of: the latch; and, the lid, in a railcar coordinate system, the railcar coordinate system fixed relative to the moving railcar.

19. The method of claim 18, wherein the step of detecting the position of the at least one of: the latch; and, the lid, further comprises detecting which side the latch is located relative to the moving railcar.

20. The method of claim 18, wherein the step of detecting the position of the at least one of: the latch; and, the lid, further comprises detecting edges of the lid and determining an tilt angle of the railcar.

21. The method of claim 14, wherein the moving railcar coordinate system, the measured moving speed of the moving railcar, and a latch/lid coordinate system are used to determine the adjusted toolpath, the latch/lid coordinate system fixed relative to the robot arm.

22. The method of claim 21, wherein the measured moving speed of the moving railcar is integrated to determine a position of the railcar.

23. The method of claim 21, wherein moving railcar coordinate system, the measured moving speed of the moving railcar, and the latch/lid coordinate system is used to determine the adjusted toolpath in response to a synchronization signal.

24. The method of claim 23, wherein the adjusted toolpath is executed relative to the latch/lid coordinate system.

25. The method of claim 24, wherein the adjusted toolpath causes the robot arm to follow along with the at least of: the latch; and, the lid, on the moving railcar, while the robot arm is executing the operation on the at least one of: the latch; and, the lid.

26. A railcar loading system for loading materials into a series of moving railcars passing through a series of stations, each railcar having a latch and a lid, the railcar loading system comprising:
  at least one sensing system for detecting positions of the latch and positions of the lid on a moving railcar relative to a railcar coordinate system, the railcar coordinate system fixed relative to the moving railcar;
  at least one velocity sensor for measuring a moving speed of the moving railcar;
  a first robot arm for performing an operation of unlatching the latch at an unlatching station;
  a second robot arm for performing an operation of opening the lid at a lid opening station;
  a loading device for performing an operation of loading materials into each moving railcar at a filling station;
  a third robot arm for performing an operation of closing the lid at a lid-closing station;
  a fourth robot arm for performing an operation of latching the latch at a latching station; and
  at least one controller for generating commands to instruct each robot arm for performing the corresponding operation,
  wherein the at least one controller uses a measured moving speed of the moving railcar and the position of at least one of: the latch, and, the lid, to determine an adjusted toolpath for each robot arm, and wherein the at least one controller instructs each robot arm to follow the determined adjusted toolpath to engage with one of: the latch; and the lid, while the railcar is moving through the station to perform the robot arms corresponding operation.

27. The railcar loading system of claim 26, wherein the at least one sensing system comprises a first sensing system located at the unlatching station, a second sensing system located at the lid opening station, a third sensing system located at the lid-closing station and a fourth sensing at the latching station.

28. The railcar loading system of claim 27, wherein each of the sensing systems comprises a plurality of cameras.

29. The railcar loading system of claim 26, further comprising a first scanning system for scanning a top surface of the moving railcar before the unlatching station.

30. The railcar loading system of claim 29, further comprising a second scanning system at the loading station for scanning an interior of the moving railcar before loading materials into the moving railcar.

* * * * *

UNITED STATES PATENT AND TRADEMARK OFFICE
CERTIFICATE OF CORRECTION

PATENT NO. : 11,511,776 B2
APPLICATION NO. : 16/690186
DATED : November 29, 2022
INVENTOR(S) : Martin Murray et al.

It is certified that error appears in the above-identified patent and that said Letters Patent is hereby corrected as shown below:

On the Title Page

Item (73) Assignee reads as "BHP BILLITON CANADA INC." Please correct the Assignee to read as "BHP Canada Inc."

Signed and Sealed this
Eleventh Day of April, 2023

Katherine Kelly Vidal
*Director of the United States Patent and Trademark Office*